United States Patent [19]
Kakemizu

[11] Patent Number: 5,805,072
[45] Date of Patent: Sep. 8, 1998

[54] VC CONNECTION METHOD

[75] Inventor: Mitsuaki Kakemizu, Tokyo, Japan

[73] Assignees: Ultra-High Speed Network; Computer Technology Laboratories, both of Japan

[21] Appl. No.: 565,914

[22] Filed: Dec. 1, 1995

[30] Foreign Application Priority Data

Dec. 12, 1994 [JP] Japan ..................................... 6-307615

[51] Int. Cl.$^6$ ........................... G05B 13/02; H04L 12/50; H04L 12/56; H04J 3/24
[52] U.S. Cl. .................... 340/825.03; 340/826; 340/827; 340/825.08; 370/408; 370/469; 370/351; 395/858; 395/200.1; 395/200.11
[58] Field of Search .............................. 340/825.03, 826, 340/827, 825.08, 825.79, 7; 370/351, 395, 397, 408, 469, 409; 395/200.1, 200.11, 200.2, 858

[56] References Cited

U.S. PATENT DOCUMENTS

| 5,357,508 | 10/1994 | Le Boudec et al. | 370/58.3 |
| 5,425,026 | 6/1995 | Mori | 370/60 |
| 5,519,836 | 5/1996 | Gawlick et al. | 395/20.15 |
| 5,579,480 | 11/1996 | Cidon et al. | 395/200.1 |

OTHER PUBLICATIONS

"Fast Connection Establishment in Large–Scale Networks" by W.A. Doeringer et al., INFOCOM '93, pp. 489–496, 1993 No month.

"Fast Bandwidth Reservation Scheme with Multi–Link & Multi–Path Routing in ATM Networks" by H. Suzuki et al., INFOCOM '92, pp. 2,233–2,240, 1992 No month.

Primary Examiner—Michael Horabik
Assistant Examiner—Yonel Beaulieu
Attorney, Agent, or Firm—Blakely Sokoloff Taylor & Zafman

[57] ABSTRACT

In response to a band reservation request based on a VC connection request or a burst information transmission start request upon a call connection from an originating station, a switching node accommodating the originating station sends a band reservation request to a two-layer subnet manager. This two-layer subnet manager sequentially and parallelly sends band reservation requests in the direction of low hierarchical level, i.e., direction of one-layer subnetwork. The band reservations for a given link located on a desired route are performed by switching nodes located on the two sides of the given link.

16 Claims, 7 Drawing Sheets

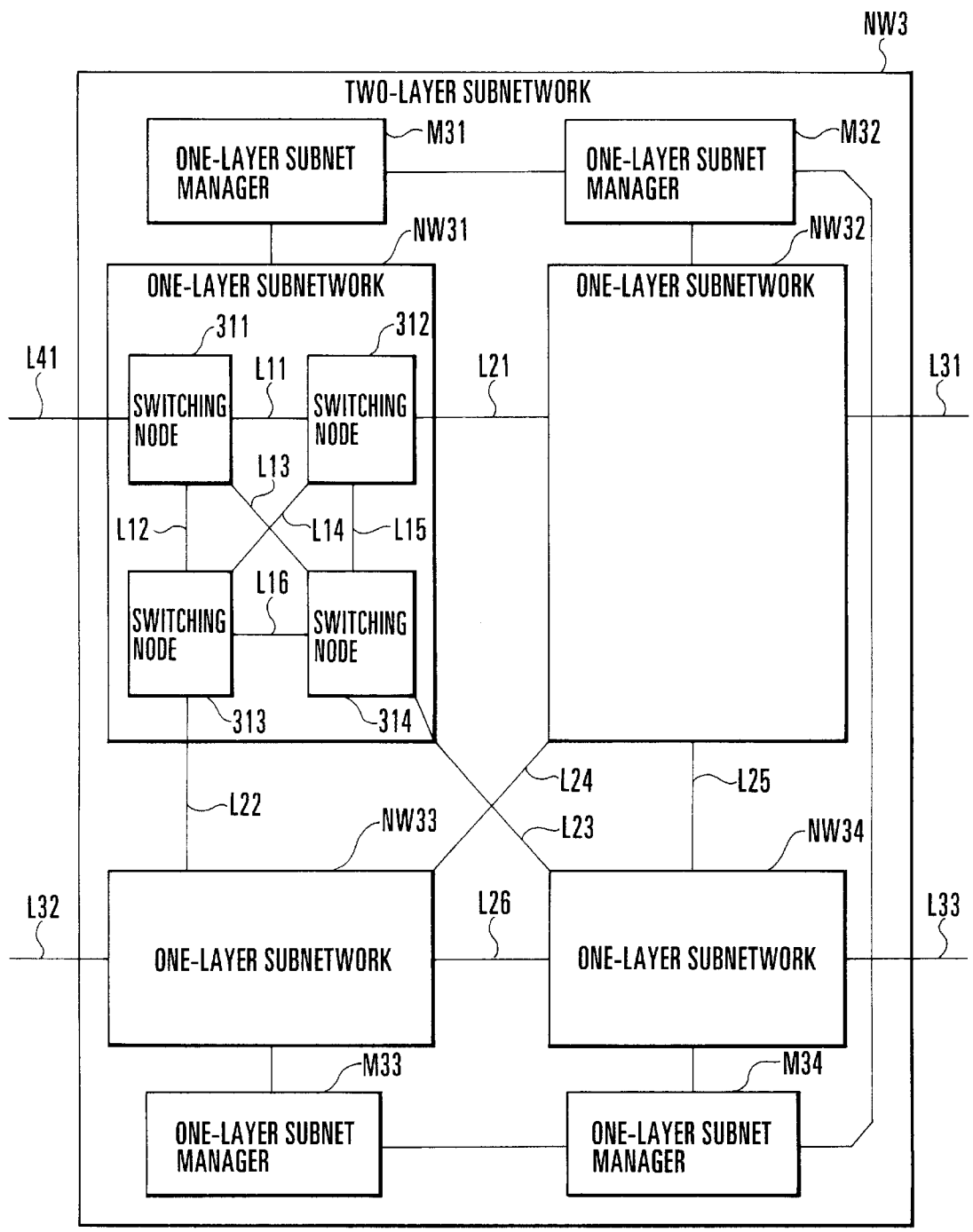
F I G. 3

| LINK | AVAILABLE BANDWIDTH Mbps |
|---|---|
| L41 | 40 |
| L11 | 20 |
| L12 | 20 |
| L13 | 10 |

FIG.4(a)

| ROUTE | ORDER | VIA LINK |
|---|---|---|
| 311~311 | 1<br>2<br>3<br>4 | L11<br>L12-L14<br>L13-L15<br>L12-L16-L15 |
| 311~313 | 1<br>⋮ | L12<br>⋮ |

FIG.4(b)

| ROUTE | ORDER | VIA LINK |
|---|---|---|
| NW31~NW32 | 1<br>2<br>3<br>4 | L21<br>L22-L24<br>L23-L25<br>L22-L26-L25 |
| NW31~NW33 | 1<br>⋮ | L22<br>⋮ |

FIG.4(c)

| ROUTE | ORDER | VIA LINK |
|---|---|---|
| NW3~NW4 | 1<br>2<br>3<br>4 | L31<br>L32-L34<br>L33-L35<br>L32-L36-L35 |
| NW3~NW5 | 1<br>⋮ | L32<br>⋮ |

VC CONNECTION METHOD

BACKGROUND OF THE INVENTION

The present invention relates to a VC connection method and, more particularly, to a VC connection method of routing originating and terminating stations and performing a band reservation/release in a network constituted by a plurality of switching nodes.

In communication of audio information having CBR (Constant Bit Rate) traffic characteristics for sending data to a network at a constant rate and computer-processed image information having burst traffic characteristics for sending a large amount of data to a network within a short period of time, using a network constituted by a plurality of switching modes, a route for connecting the originating and terminating stations is determined and a band based on a necessary transmission capacity is reserved in accordance with a virtual channel (to be referred to as a VC hereinafter) connection request from the originating station. In response to a VC release request upon completion of communication, the reserved band is released.

In an UNI (User-Network Interface) Q2931 recommended by the ITU and an NNI (Network Node Interface) under examination, routing and a band reservation/release must be performed for the respective nodes and links between the nodes from an originating node accommodating the originating station to a terminating node accommodating the terminating station.

According to this method, however, it takes a long period of time in VC connection processing. At the same time, a series of links up to the terminating station cannot be routed at once, and the effective utilization of band resources in a network has limitations.

To the contrary, a conventional method of performing parallel processing of routing and a band reservation upon hierarchical routing in a network is proposed (e.g., W. A. Doeringer et al., "Fast Connection Establishment in Large-Scale Networks", INFOCOM '93, PP. 489–496, 1993).

There is also proposed a method of parallelly reserving the bands of all the routes connecting the originating and terminating stations from the originating station to the terminating station and employing the first route reaching the terminating station (e.g., H. Suzuki et al., "Fast Bandwidth Reservation Scheme with Multi-link & Multi-path Routing in ATM Networks", INFOCOM '92, PP. 2,233–2,240, 1992).

According to the former conventional VC connection method, since routing and a band reservation are parallelly performed by hierarchical routing, the connection processing time can be shortened. However, a loss probability increases to degrade VC connection because routing is performed in a high hierarchical level without considering a possibility in which a band reservation in a lower hierarchical level is enabled or not.

According to the latter conventional VC connection method, since the band reservations are performed for all the routes at once, non-selected routes must release the temporarily reserved bands. The amount of call processing in the entire network increases, and the loss probability of the entire network increases due to wasteful band reservations.

SUMMARY OF THE INVENTION

It is an object of the present invention to provide a VC connection method capable of performing routing and a band reservation/release at a higher speed without increasing the loss probability in the entire network.

In order to achieve the above object of the present invention, there is provided a VC connection method for determining a connection route on a network having a plurality of switching nodes and performing a band reservation/release corresponding to a desired communication capacity for a link for connecting each switching node on the connection route in connecting originating and terminating stations through the network in response to a VC connection/release request or a burst information transmission start/end request upon a call connection from the originating station accommodated in a predetermined switching node, comprising causing the network to have a hierarchical structure in which each of first-layer subnetworks consists of a plurality of switching nodes interconnected through a predetermined link, and causing each of mth-layer (m is a positive integer of not less than 2) subnetworks consists of a plurality of (m−1)-layer subnetworks, providing a first-layer subnetwork manager for the first-layer subnetwork to update and hold a plurality of routes, in a predetermined order, connecting the switching nodes and first-layer subnetworks,between predetermined switching nodes in a home subnetwork and predetermined first-layer subnetworks connected to have the same hierarchical level, and providing an mth-layer subnet manager for the mth-layer subnetwork to update and hold a plurality of routes, in a predetermined order, connecting predetermined mth-layer subnetworks for the predetermined. mth-layer subnetworks connected to have the same hierarchical level, causing the mth-layer subnet manager to refer to contents of a home subnetwork in response to a band reservation request to determine an optimal route connecting requested mth-layer subnetworks, send a band reservation request for a link located on this optimal route, and send a band reservation request for a route in the mth-layer subnetwork to an arbitrary (m−1)th-layer subnet manager in each (m−1)th-layer subnetwork located on the optimal route, causing the first-layer subnet manager to refer to contents of a home subnetwork in response to a band reservation request from a subnet manager of high hierarchical level to determine an optimal route connecting predetermined first-layer subnetworks as a route in the requested subnetwork of high hierarchical level, send a band reservation request for a link located on the optimal route, and send a band reservation request for a route in each first-layer subnetwork to the first-layer subnet manager of each first-layer subnetwork located on the optimal route, causing the first-layer subnet manager located on the optimal route to refer to contents of a home one-layer subnetwork in response to a band reservation request from an arbitrary first-layer subnet manager to determine an optimal route between predetermined switching nodes as a route in the requested first-layer subnetwork, and sending a band reservation request from the predetermined node accommodating the originating station to the predetermined mth-layer subnet manager in response to a band reservation request based on the VC connection request or the burst information transmission start request upon the call connection from the originating station to sequentially and parallelly send band reservation requests from the mth-layer subnet manager to links of low hierarchical level, thereby reserving bands for switching nodes at two sides of each link located on a desired route.

BRIEF DESCRIPTION OF THE DRAWINGS

FIG. 3 is a block diagram showing a two-layer subnetwork;

FIGS. 4A to 4C are views for explaining the arrangements of various holding units;

DESCRIPTION OF THE PREFERRED EMBODIMENT

The present invention will be described with reference to the accompanying drawings.

Figure 1:
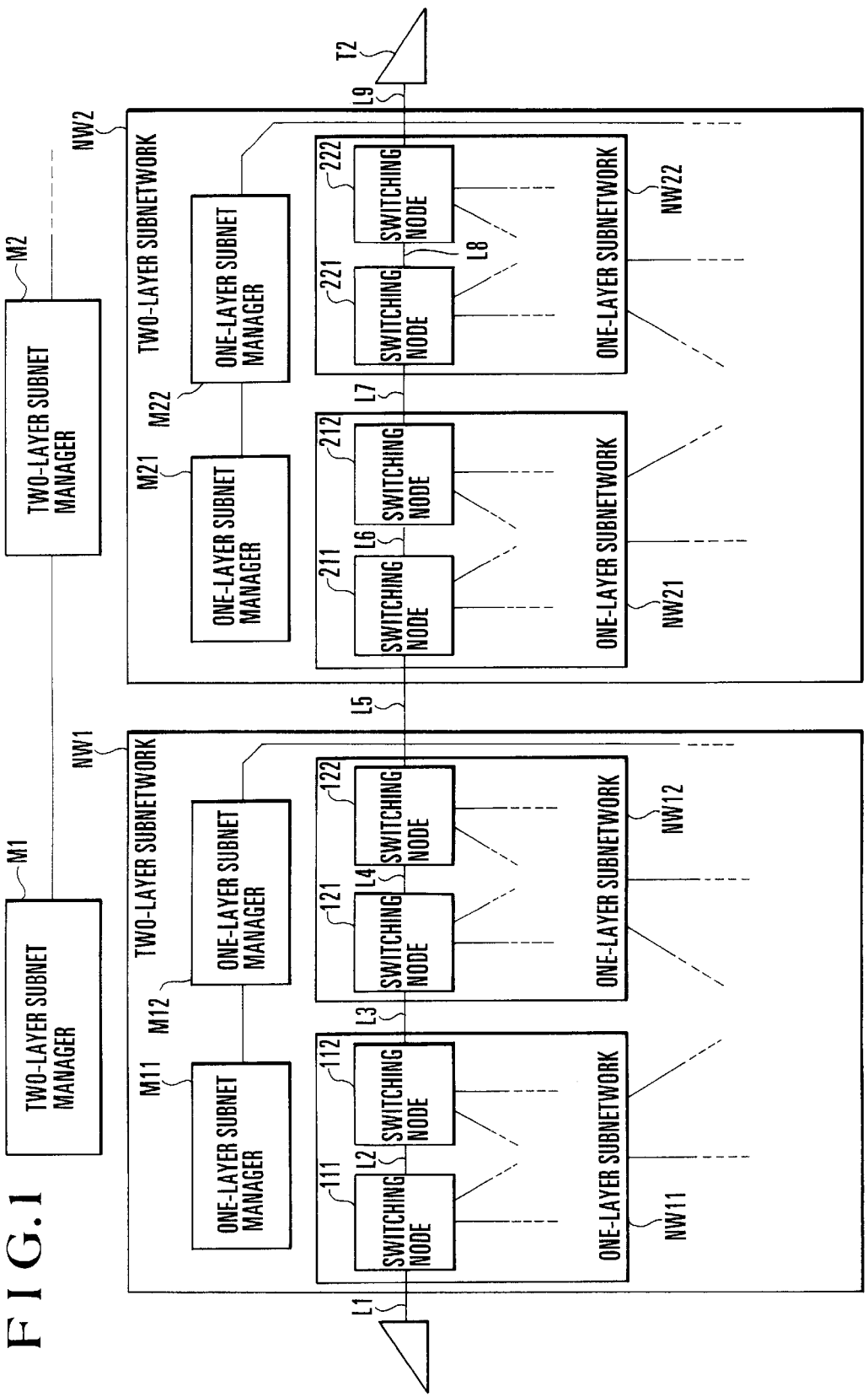
FIG. 1 is a block diagram showing the arrangement of a hierarchical network system according to an embodiment of the present invention.

FIG. 1 shows a hierarchical network system according to an embodiment of the present invention. Referring to FIG. 1, reference symbol T1 denotes an originating station; T2, a terminating station; NW1 and NW2, two-layer subnetworks respectively having a plurality of one-layer subnetworks NW11 NW12, . . . , which are interconnected as subnetworks of low hierarchical level and a plurality of one-layer subnetworks NW21, NW22, . . . which are interconnected as subnetworks of low hierarchical level; and M1 and M2, two-layer subnet managers for managing the two-layer subnetworks NW1 and NW2, respectively.

The one-subnetworks NW11 and NW12 have a plurality of interconnected switching nodes 111, 112, . . . and a plurality of interconnected switching nodes 121, 122, . . . , respectively. Although not shown, the remaining one-layer subnetworks have the same arrangement as described above.

The one-subnetworks NW21 and NW22 have a plurality of interconnected switching nodes 211, 212, . . . and a plurality of interconnected switching nodes 221, 222, . . . , respectively. Although not shown, the remaining one-layer subnetworks have the same arrangement as described above.

Reference symbols M11, M12, M21, and M22 denote one-layer subnet managers for managing the one-layer subnetworks NW11, NW12, NW21, and NW22, respectively. The one-layer subnet managers M11, M12, . . . and the one-layer subnet managers M21, M22, . . . are connected through predetermined communication lines, respectively, to share the management information of the one-layer subnetworks NW11, NW12, . . . , and NW21, NW22, . . . .

Similarly, the two-layer subnet managers M1 and M2 are connected through predetermined lines, respectively, to share the management information of the two-layer subnetworks NW1 and NW2. Note that if the two-layer subnetworks M1 and M2 have further two-layer subnetworks, the subnetworks M1 and M2 also share the management information of the further two-layer subnetworks.

The respective switching nodes and the subnet managers of each hierarchical level are connected through predetermined communication lines. Messages such as a band reservation/release request message and a band reservation/release response message to this request are directly exchanged as control messages for call processing between the subnet managers of the same hierarchical level, between the subnet managers of the different hierarchical levels, and between an arbitrary switching node and the subnet manager. The respective available link bandwidths calculated by the switching nodes are directly notified to management source subnet managers for managing the respective links.

As described above, since various control messages can be directly exchanged between all the subnet managers belonging to the common subnetwork of high hierarchical level and between the subnet managers and the switching nodes regardless of hierarchical levels, the control message arrival time can be shorter than that of transfer through a plurality of subnet managers. The VC connection time is shortened to reduce the processing load.

Since each available link bandwidth is directly notified from the switching node to the management source subnet manager for managing this link, the notification delay time can be shortened, and the inter-subnet routing table can be quickly updated. The reliability of the table can be improved, and the loss probability can be reduced.

The originating station T1 is accommodated in the switching node 111 through a link L1 and the terminating station T2 is accommodated in the switching node 222 through a link L9.

The switching nodes 111 and 112, the switching nodes 121 and 122, the switching nodes 211 and 212, and the switching nodes 221 and 222 are connected through links L2, L4, L6, and L8, respectively. The one-layer subnetworks NW11 and NW12 and the one-layer subnetworks NW21 and NW22 are connected through links L3 and L7, respectively. The two-layer networks NW1 and NW2 are connected through a link L5.

Figure 2C:
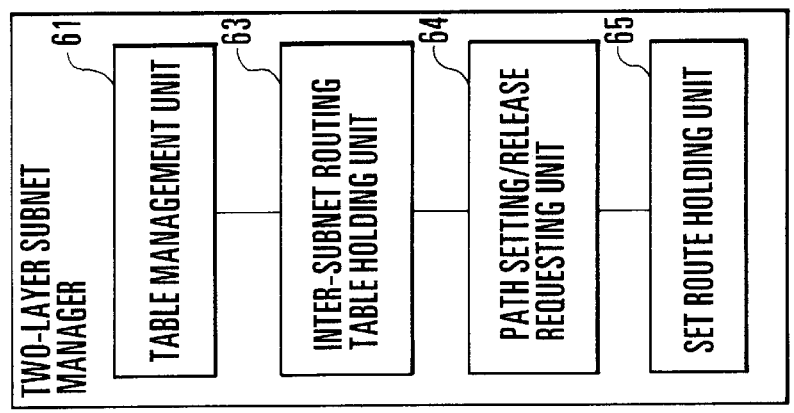
FIGS. 2A to 2C are functional block diagrams showing the internal arrangements of subnet managers and a switching node.
Figure 2B:
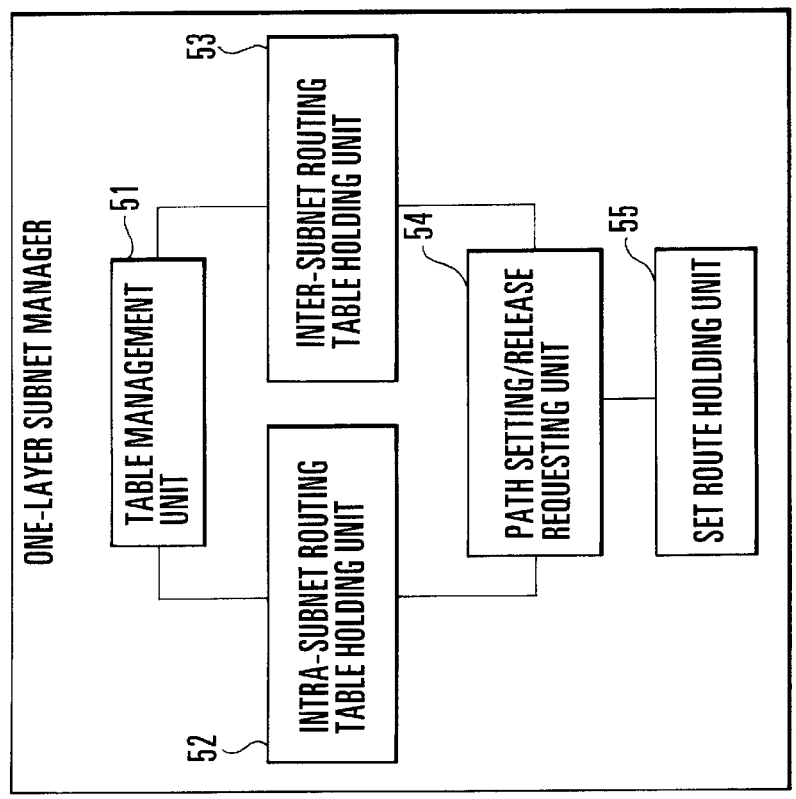
Figure 2A:
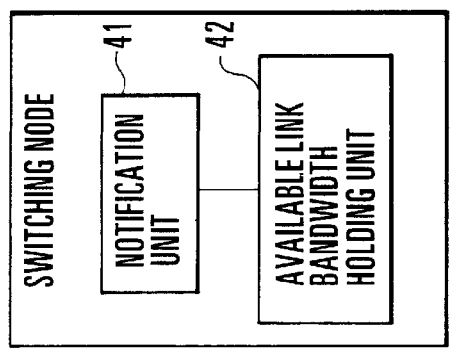

FIGS. 2A to 2C show the internal arrangements of subnet managers and a switching node. FIG. 2A shows a switching node, FIG. 2B shows a one-layer subnet manager, and FIG. 2C shows a two-layer subnet manager.

Referring to FIG. 2A, reference numeral 42 denotes an available link bandwidth holding unit for holding the occupied rate of each link connected to the switching node; and 41, a notification unit for notifying a new available link bandwidth to the one-layer subnet manager when a difference between the available link bandwidth held in the available link bandwidth holding unit 42 and the new available link bandwidth calculated from the free band of this link and the loss probability of a cell (or packet) exceeds a predetermined threshold.

Each switching node has a call control management function for an accommodated link and a switching function for data flowing on a link as in a general ATM or packet switching unit.

In particular, a requested bandwidth is assured in the free band for a predetermined link in accordance with a band reservation request for this link accommodated in the home switching node. At the same time, a band used in the requested VC is released in accordance with the band release request for the predetermined link accommodated in the home switching node.

Referring to FIG. 2B, reference numeral 52 denotes an intra-subnet routing table holding unit for holding an intra-subnet routing table which sequentially stores optimal routes for switching nodes managed by the home one-layer subnet manager, i.e., for each switching node accommodating a station or each switching node adjacent to another subnetwork. Reference numeral 53 denotes an inter-subnet routing table holding unit for holding an inter-subnet routing table which sequentially stores optimal routes for each one-layer subnetwork connected to each one-layer subnetwork of the same hierarchical level, i.e., for each one-layer subnetwork having the same hierarchical level as the home one-layer subnetwork in a two-layer subnetwork, a one-layer subnetwork having a switching node accommodating a station, or each one-layer subnetwork adjacent to another two-layer subnetwork.

Reference numeral 51 denotes a table management unit for extracting, on the basis of an available link bandwidth and the number of hops, an optimal route from the routes connecting a switching node accommodating a station and each one of the switching nodes adjacent to other subnetworks, and for sequentially storing the optimal routes in the inter-subnet routing table. At the same time, the table management unit 51 exchanges the available link bandwidth of a boundary link of another one-layer subnetwork with a one-layer subnet manager connected on the same hierarchical level and identical to the home one-layer manager, and therefore, the table management unit 51 extracts, on the basis of the available link bandwidth and the number of hops, an optimal route from the routes connecting a one-layer subnetwork having a switching node accommodating a station and each one of one-layer subnetworks adjacent to other two-layer subnetworks, and subsequently stores the optimal routes in the inter-subnet routing table.

Reference numeral 55 denotes a set route holding unit for holding route information of a route reserved upon execution of a band reservation; and 54, a path setting/release requesting unit for selecting an optimal route from the routes serving as band reservation request targets with reference to the intra-subnet routing table holding unit 52 and the inter-subnet routing table holding unit 53 in accordance with a band reservation request for an arbitrary route from the two-layer subnet manager, thereby performing band reservations for the switching nodes and links which constitute the optimal route. At the same time, the path setting/release requesting unit 54 stores the selected route in the set route holding unit 55. The path setting/release requesting unit 54 reads out route information of a route serving as a band release request target from the set route holding unit 55 in accordance with a band release request for an arbitrary route from the switching node and the two-layer subnet-manager. On the basis of this route information, the path setting/release requesting unit 54 releases the bands of the switching nodes and links which constitute the route.

Referring to FIG. 2C, reference numeral 63 denotes an inter-subnet routing table holding unit for sequentially storing optimal routes for each two-layer subnetwork connected to the same hierarchical level and identical to the home two-layer subnetwork, i.e., connected between a two-layer subnetwork having a switching node accommodating a station and each one of the two-layer subnetworks adjacent to other subnetworks of high hierarchical level. Reference numeral 61 denotes a table management unit for exchanging the available link bandwidth notified from each switching node accommodating boundary links of other two-layer subnetworks with the two-layer subject manager connected on the same hierarchical level and identical to the home two-layer subnet manager. On the basis of this exchange, the table management unit extracts, on the basis of the available link bandwidth and the number of hops, an optimal route from the routes connecting the two-layer subnetwork having a switching node accommodating a station and each of the two-layer subnetworks adjacent to other subnetworks of high hierarchical level. The extracted optimal routes are sequentially stored in the inter-subnet routing table.

Reference numeral 65 denotes a set route holding unit for holding route information of a route reserved upon execution of a band reservation; and 64, a path setting/release requesting unit for selecting an optimal route from the routes serving as the band reservation request targets with reference to the inter-subnet routing table holding unit 63 in accordance with a band reservation request for an arbitrary route from a switching node, and for requesting the band reservations for the one-layer subnet managers and links which constitute the optimal route. At the same time, the path setting/release requesting unit 64 stores the selected route in the set route holding unit 65. In response to a band release request for an arbitrary route from a switching node, the path setting/release requesting unit 64 reads out route information for a route serving as the band release request target from the set route holding unit 65, and performs the band releases for the one-subnet managers and links which constitute the target route.

The arrangements of the intra-subnet routing table holding unit 52 and the inter-subnet routing table holding unit 53 in the one-layer subnet manager will be described below.

FIG. 3 shows a two-layer subnetwork. Referring to FIG. 3, reference numerals 311 to 314 denote switching nodes connected to each other through links L11 to L16. The switching nodes 311 to 314 constitute a one-layer subnetwork NW31. The one-layer subnetwork NW31 is connected to one-layer subnetworks NW32 to NW34 each having the same arrangement as that of the one-layer subnetwork NW 31 through links L21 to L26. The one-layer subnetworks NW31, NW32, NW33, and NW34 constitute a two-layer subnetwork NW3. The overall networks have a hierarchical structure consisting of one- and two-layer subnetworks.

The one-layer subnetworks NW31 to NW34 have links L41, and L31 to L33 connected to other two-layer subnetworks, respectively. The one-layer subnetworks NW31 to NW34 have one-layer subnet managers M31 to M34, respectively. The one-layer subnet managers M31 to M34 are connected through predetermined communication lines.

FIGS. 4A to 4C explain the arrangements of various holding units, respectively. FIG. 4A shows the available link bandwidth holding unit 42 in the switching node 311, FIG. 4B shows the intra-subnet routing table in the one-layer subnet manager M31, and FIG. 4C shows the inter-subnet routing table in the one-layer subnet manager M31.

The switching node 311 of the one-layer subnetwork NW31 causes the available link bandwidth holding unit 42 to hold available link bandwidths representing the remaining available link bandwidths of the links L41, and L11 to L13 connected to the one-layer subnetwork NW31, as shown in FIG. 4A. When the difference between each available link bandwidth and the actual available link bandwidth exceeds a predetermined threshold, the notification unit 41 notifies this to a predetermined subnet manager of high hierarchical level, thereby updating the corresponding available link bandwidth in the available link bandwidth holding unit 42.

As described above, when a variation in available link bandwidth exceeds the threshold, this is notified to the one-layer subnet manager. As compared with control in which an available link bandwidth is notified at any time, the processing loads on the switching nodes and each subnet manager can be reduced, and an unexpected variation in available link bandwidth can be quickly notified.

As a method of notifying the available link bandwidth, an available link bandwidth may be notified from a switching node to each subnet manager every predetermined interval. In this case, the arrangement and processing for the threshold and comparison can be omitted from each switching node, thereby simplifying the arrangement of each switching node.

A bandwidth reserved in each link when viewed from one switching node connected to one side of this link is equal to that the other switching node connected to the other side of this link. The available link bandwidths with respect to the switching nodes connected to the two sides of each node are equal to each other accordingly.

The available link bandwidth with respect to a management source subnet manager for managing each link may be notified in accordance with an instruction from one of the switching nodes connected to the two sides of each link, e.g., from the management source subnet manager, or an instruction from a side determined by negotiation between the two switching nodes. The processing load of the switching node which does not perform notification can be reduced. At the same time, the processing load of the management source subnet manager in management of the available link bandwidth can be reduced.

As shown in FIG. 4B, in the one-layer subnet manager M31, the routes connecting predetermined switching nodes are stored from the optimal route in the intra-subnet routing table in the intra-subnet routing table holding unit 52. The table management unit 51 updates and manages the routes at any time on the basis of the available link bandwidths notified from the switching nodes 311 to 314 in the one-subnetwork NW31.

In particular, in the intra-subnetwork routing table, routes connecting a switching node accommodating a station and each of the switching nodes having a boundary link of another subnetwork, e.g., routes L11, L12–L14, L13–L15, and L12–L16–L15 connecting the switching nodes 311 and 312 are stored from a route having a smaller via link count and a larger available link bandwidth for the links constituting this route.

To select a route connecting an arbitrary station accommodated in the one-layer subnetwork NW31 to the boundary link L21, L22, L23, or L41 of another one-or two-layer subnetwork in the one-layer subnetwork NW31, a route which has the highest order corresponding to a route connecting the switching nodes 311 to 314 and accommodates the desired links is selected from the intra-subnet routing table 52. The via links constituting an optimal route at this moment can be easily selected.

As shown in FIG. 4C, in the one-layer subnet manager M31, routes connecting predetermined one-layer subnets are stored from an optimal route in the inter-subnet routing table in the inter-subnet routing table holding unit 53. The table management unit 51 obtains the available link bandwidths of boundary links from the switching nodes accommodated in each one-layer subnetwork, i.e., the switching nodes 311 to 314 having these boundary links of other one-subnetworks. The table management unit 51 exchanges the available link bandwidths between the one-layer subnetworks connected to the same hierarchical level, i.e., between the one-layer subnetworks NW23 to NW25 of the two-layer subnetwork NW3. The table management unit 51 then updates and manages the inter-subnet routing table at any time on the basis of the available link bandwidths of the links L12 to L17 connecting these one-layer subnetworks.

All the routes connecting a one-layer subnetwork having a switching node accommodating a station and each of the one-layer subnetworks adjacent to other subnetworks, e.g., all routes L21, L22–L24, L23–L25, and L22–L26–L25 connecting the one-layer subnetwork NW31 and the one-layer subnetwork NW32 are stored from a route having a small via link count and a larger available link bandwidth of links constituting the route.

To select a route connecting any two of the boundary links L41 and L31 to L33 between a station connected to the one-layer subnetwork NW31 and another two-layer subnetwork, a route which has the highest order corresponding to the route connecting the one-layer subnetworks NW31 to NW34 and accommodates the two desired links is extracted from the inter-subnet routing table 53. Therefore, the via links constituting the optimal route at this moment can be easily selected.

Note that the remaining one-layer subnet managers M32 to M34, and the intra-subnet routing table holding units 52 and the inter-subnet routing table holding units 53 of the one-layer subnet managers in the remaining two-layer subnetworks have the same arrangements as described above.

The arrangements of the respective tables in the inter-subnet routing table holding unit 63 in the two-layer subnet manager will be described below.

Figures 5, 6:
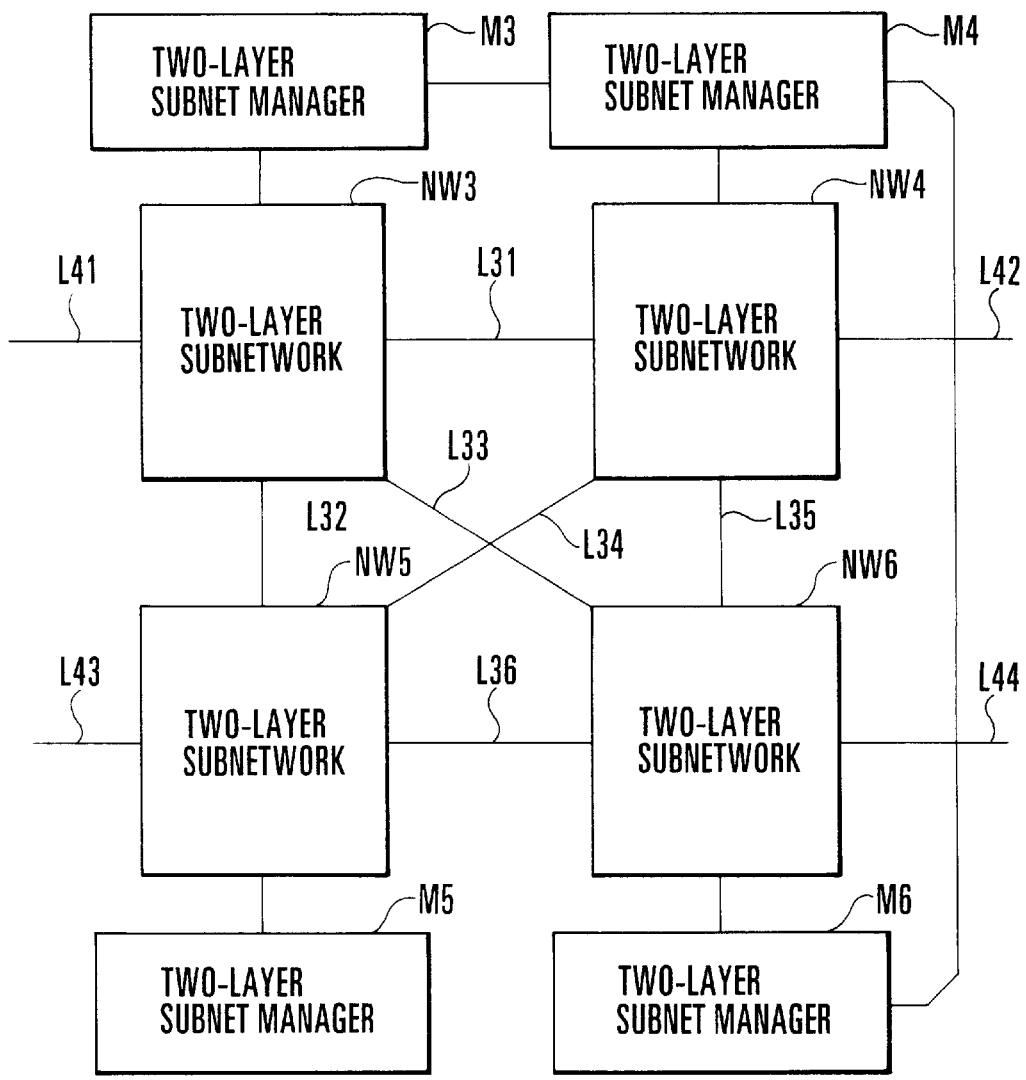
FIG. 5 is a block diagram showing the arrangement of a network of high hierarchical level.
FIG. 6 is a view for explaining the arrangement of an inter-subnet routing table.

FIG. 5 shows a network of high hierarchical level (three-layer network) constituted by a plurality of two-layer subnetworks. Reference symbols NW3 to NW6 denote two-layer subnetworks interconnected through links L31 to L36. The subnetworks NW3 to NW6 constitute the subnetwork of high hierarchical level (three-layer subnetwork). The two-layer subnetworks NW3 to NW6 have links L41 to L44 connected to other subnetworks of high hierarchical level. As shown in FIG. 3, each two-layer subnetwork has a plurality of one-layer subnet managers. Two-layer subnet managers M3 to M6 are connected through predetermined communication lines.

FIG. 6 explains the arrangement of the inter-subnet routing table in the two-layer subnet manager M3.

As shown in FIG. 6, in the two-layer subnet manger M3, the inter-subnet routing table in an inter-subnet routing table holding unit 63 stores routes connecting two predetermined subnets from an optimal route. A table management unit 61 obtains the available link bandwidths of boundary links from switching nodes accommodated in each two-layer subnetwork, i.e., the switching nodes having these boundary links of other two-layer subnetworks. The table management unit 61 exchanges the available link bandwidths between the two-layer subnetworks NW4 to NW6 connected to the same hierarchical level. The table management unit 61 updates and manages the inter-subnet routing table at any time on the basis of the available link bandwidths of the links L31 to L36 connecting these two-layer subnetworks.

In particular, in the inter-subnet routing table, all routes connecting the two-layer subnetwork having the switching node accommodating a station and each of the two-layer subnetworks adjacent to other subnetworks, e.g., all routes L31, L32–L34, L33–L35, L32–L36–L35 connecting the two-layer subnetwork NW3 and the two-layer subnetwork NW4 are stored from a route having a small via link count and a larger available link bandwidth for the links constituting the route.

To select a route connecting any two of the boundary links L41 to L44 between the station connected to the one-layer subnetwork NW3 and other subnetworks of high hierarchical level, a route which has the highest order corresponding to the route connecting the two-subnetworks NW3 to NW6 and accommodates the two desired links is selected from the inter-subnet routing table 63. Therefore, the via links constituting the optimal route at this moment can be easily selected.

Note that the remaining two-layer subnet managers M4 to M6 and the inter-subnet routing table holding units 63 of the two-layer subnet managers in the remaining subnetworks of high hierarchical level have the same arrangements as described above.

When a subnet of high hierarchical level is arranged, each subnet manager has the above-mentioned one-layer subnetwork as a subnetwork of low hierarchical level which has the same arrangement as that of the two-layer subnet manager M3.

As described above, a network has a hierarchical structure in which a subnetwork of high hierarchical level is constituted by a plurality of subnetworks of low hierarchical level. A subnet manager is arranged for each subnetwork. Each optimal route between subnetworks having the same hierarchical level subordinating the corresponding subnetwork of high hierarchical level is managed, and all the links constituting the network can be managed in distributed control. Failures caused by concentration of management processing for the switching node accommodating the originating station and the subnet manager can be avoided. At the same time, an optimal route can be quickly selected without arranging, in a network, a node having a high processing capacity capable of executing these management processing operations.

Routing and band reservation processing operations from the originating station T1 to the terminating station T2 in accordance with a band reservation request will be described with reference to FIGS. 1 and 7.

Figure 7:
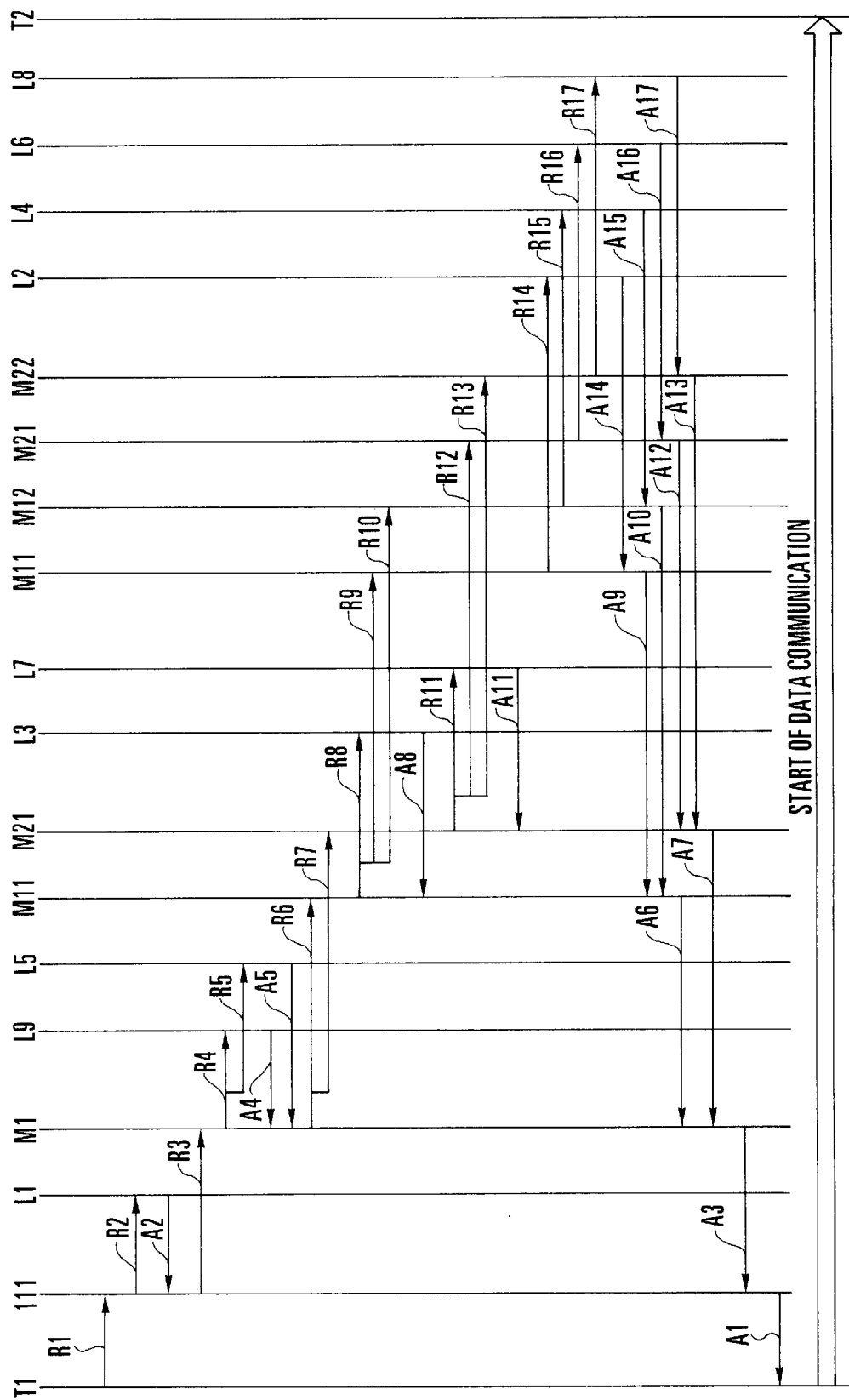
FIG. 7 is a sequence chart showing VC connection procedures.

FIG. 7 shows the sequence of the VC connection procedures from the originating station T1 to the terminating station T2. The same reference numerals as in FIG. 1 denote the same parts in FIG. 7.

Referring to FIG. 7, reference symbols R1 to R17 denote band reservation requests; and A1 to A17, band reservation responses sent back in correspondence with the band reservation requests R1 to R17, respectively.

In response to a transmission request generated by the originating station T1, the band reservation request R1 including a necessary communication bandwidth, a terminating address representing the terminating station, and a home address representing the originating station is sent to the switching node 111 serving as an accommodating source of the originating station T1.

[Band reservation request R1]
 Transmission destination: T1→111
 Route: T1–T2

Note that the originating and terminating stations have the following addresses:
 Originating station T1 address=1; 11; 111; T1
 Terminating station T2 address=2; 22; 222; T2

Each address consists of a string of identifiers (to be referred to as IDs hereinafter) for identifying each subnetwork and a switching node. Each address represents a two-layer subnetwork ID, a one-layer subnetwork ID, a switching node ID, and a station ID from the upper digit position.

The switching node 111 transmits the band reservation request R2 for the link L1 connecting the originating station T1 in response to the band reservation request R1 from the originating station T1.

[Band reservation request R2]
 Transmission destination: 111→111, T1
 Route: L1

The band reservation request R2 for the link L1 is actually transmitted to the nodes at the two sides of the link L1, i.e., the switching node 111 and the originating station T1. The switching node 111 and the originating station T1 allocate desired bandwidths in response to the band reservation request from the originating station T1, i.e., perform band reservations.

If a free band wider than the desired band is present and band reservations are successful in both the switching node 111 and the originating station T1, the band reservation response A2 representing the success of band reservations is sent back from the switching node 111 and the originating station T1 to the switching node 111. The switching node 111 confirms the end of band reservation for the link L1 with the originating station T1.

If the band reservation becomes unsuccessful because one of the switching node 111 and the originating station T1 does not have a band wider than the desired band, the band reservation response A2 representing the unsuccess is send back to the switching node 111 also serving as the request source of the band reservation request R2. In response to this, the switching node 111 sends back the band reservation response A1 representing the unsuccess to the request source for band reservation request received by the switching node 111. Therefore, the unsuccess of the band reservation is notified from the originating station T1 to the user.

In response to the end of band reservation to the link L1, the switching node 111 compares the addresses of the originating and termination stations T1 and T2 from the higher hierarchical level to the lower hierarchical level. The switching node 111 sends a band reservation request to the subnet manager or switching node of a subnetwork represented by a given address of the originating station T1 and having a hierarchical level obtained upon first detection of another subnetwork ID or another switching node ID.

When the originating and terminating stations T1 and T2 have the given address, another subnetwork ID is detected in the first two-layer subnetwork level. The switching node 111 sends the band reservation request R3 from the subnetwork at the address of the originating station T1 which corresponds to this hierarchical level to the two-layer subnet manager M1 of the two-layer subnetwork NW1. The switching node 111 stores the two-layer subnet manager M1 as its transmission destination.

[Band reservation request R3]
 Transmission destination: 111→M1 switching
 Route: 111–T2

As described above, in response to the band reservation request from the originating station T1, the band reservation is performed for the link L1 between the originating station T1 and the switching node 111 serving as an originating station accommodation source. A band reservation is then performed for each link constituting a route connecting the switching node 111 and the terminating station T2. For this reason, the band reservation is preferentially performed for the link L1 over other links to reserve a desired band. A wasteful process in which a call loss is caused due to unsuccess of the band reservation for the link L1 with the originating station in spite of success of band reservations for other links can be prevented. Therefore, efficient band reservation processing can be performed.

In response to the band reservation request R3, the path setting/release requesting unit 64 of the two-layer subnet manager M1 sends the band reservation request R4 to the link L9 connecting the terminating station T2 and the switching node 222 serving as the terminating station accommodation source.

[Band reservation request R4]
 Transmission destination: M1→222, T2
 Route: L9

In practice, as in the band reservation request for the link L1 on the originating station T1 side, band reservations are performed in the switching node 222 and the terminating station T2 on the two sides of the link L9. The band reservation response A4 is sent back in response to the success of the band reservations.

On the other hand, in response to the band reservation request R3, the path setting/release requesting unit 64 of the two-layer subnet manager M1 refers to the inter-subnet routing table in the inter-subnet routing table holding unit 63 shown in FIG. 6 and extracts an optimal route located at the start of the inter-subnet routing table as a route connecting the two-layer subnetwork NW1 on the originating station T1 side which is controlled by this requesting unit 64 and the two-layer subnetwork NW2 to which the terminating station T2 belongs.

The path setting/release requesting unit 64 sends the band reservation request R5 to all the links belonging to the same hierarchical level and constituting the extracted route, i.e., in this case, the link L5.

[Band reservation request R5]

Transmission destination: M1→122, 211

Route: L5

In practice, band reservations are performed in the switching nodes 122 and 211 on the two sides of the link L5. The band reservation response A5 is sent back in response to the success of the band reservations.

In this case, in the two-layer subnet manager M1, the band reservation request R4 for the link L9 and the band reservation request R5 for the link L5 are independently transmitted in response to the band reservation request R3. The band reservations for the links L9 and L5 are parallelly performed, so that efficient band reservation processing can be performed.

Another link cannot be selected for the link L9 connecting the terminating station T2 and the switching node 222. The band reservation request R5 may be sent after the success of the band reservation is confirmed by the band reservation response A4 sent back in response to the band reservation request R4. In unsuccess of the band reservation for the link L9, band release processing for links reserved with the bands in response to the band reservation request R5 need not be performed. The processing loads in each subnet manager and each switching node can be reduced, and utilization efficiency of a subnetwork of low hierarchical level can be improved.

The path setting/release requesting unit 64 of the two-layer subnet manager M1 sends the band reservation requests R6 and R7 for routes extracted in the respective two-layer subnetworks to single subnet managers which respectively belong to the two-layer subnetworks NW1 and NW2 on the extracted routes and have a hierarchical level lower by one level than the two-layer subnetworks NW1 and NW2, i.e., the single subnet managers being one of the one-layer subnet managers M11 and M12 and one of the one-subnet managers M21 and M22. More specifically, one of the routes is a route connecting the one-layer subnetwork NW11 accommodating the originating station T1 and the one-subnetwork NW12 accommodating the link L5 in the two-layer subnetwork NW1. The other route is a route connecting the one-layer subnetwork NW21 accommodating the link L5 and the one-layer subnetwork NW 22 accommodating the terminating station T2 in the two-layer subnetwork NW2.

In this case, there are three methods as a method of causing the path setting/release requesting unit 64 to select an arbitrary one-layer subnet manager within each of the two-layer subnetworks NW1 and NW2.

The current processing loads are exchanged between the one-layer subnet managers M11 and M12 and between the one-layer subnet managers M21 and M22. When one-layer subnet managers having the minimum processing load are selected in response to the band reservation request from the path setting/release requesting unit 64, VC setting/release processing is not concentrated on the same one-layer subnet managers but is distributed, thereby improving the processing efficient as a whole.

When one of the one-layer subnet managers M11 and N12 and the one-layer subnet managers M21 and M22, which is closest to the originating station T1 is selected on the basis of the address of the originating station T1, the one-layer subnet manager selected in accordance with the originating station T1 accommodated at a given position changes. Distributed processing can be performed to some extent without requiring a special means for managing the processing load.

When the one-layer subnet managers M11 and M12 and the one-layer subnet managers M21 and M22 are selected in order or using a random number, distributed processing can be performed to some extent without requiring a special means for managing the processing load.

Using one of the above selection methods, for example, the one-layer subnet manager M11 is selected in the two-layer subnetwork NW1, and the one-layer subnet manager M21 is selected in the two-layer subnetwork NW2. The path setting/release requesting unit 64 of the two-layer subnet manager M1 sends the band reservation request R6 for a route between the one-layer subnetwork NW12 having the switching node 111 accommodating the originating station T1 and the one-layer subnetwork NW12 accommodating the link L5.

[Band reservation request R6]

Transmission destination: M1→M1

Route: NW11–NW12

In addition, the path setting/release requesting unit 64 of the two-layer subnet manager M1 sends, together with the band reservation request R6, the band reservation request R7 for a route between the one-layer subnetwork NW22 having the switching node 222 accommodating the terminating station T2 and the one-layer subnetwork NW21 accommodating the link L5.

[Band reservation request R7]

Transmission destination: M1→M21

Route: NW21–NW22

In the above description, the path setting/release requesting unit 64 of the two-layer subnet manager M1 sends the band reservation request R5 for the link L5 and at the same time the band reservation requests R6 and R7 for the one-layer subnet managers M11 and M21. However, the band reservation requests R6 and R7 for routes in the two-layer subnetworks NW1 and NW2 may be sent from the two-layer subnet manager M1 to the one-layer subnet managers M11 and M21 after the success of the band reservation for the link L5 connecting the two-layer subnetworks NW1 and NW2 is confirmed by the band reservation response sent back in response to the band reservation request R5.

For example, referring to FIG. 7, the band reservation requests R6 and R7 are simultaneously sent together with the band reservation request R5 from the two-layer subnet manager M1. In this case, after the success of a desired band reservation is confirmed by the band reservation response A5 sent back in response to the band reservation request R5 from the two-layer subnet manager M1, the band reservation requests R6 and R7 are sent from the two-layer subnet manager M1.

After the success of the band reservation for the link L5 connecting the two-layer subnetworks NW1 and NW2 is confirmed, the band reservations in the two-layer subnetworks NW1 and NW2 are requested.

When the band reservation requests R5, R6, and R7 are parallelly sent, high-speed band reservations can be realized.

On the other hand, when the band reservation requests R6 and R7 are sent after confirmation of the success of the band reservation for the link L5, the band release processing for the links whose bands have been reserved by the band reservation requests R6 and R7 need not be performed in case of the unsuccessful band reservation for the link L5. The processing loads of each subnet manager and each switching node can be reduced, and a subnetwork of low hierarchical level can be efficiently used.

In response to the band reservation request R6, the path setting/release requesting unit 54 of the one-layer subnet manager M11 refers to the inter-subnet routing table in the inter-subnet routing table holding unit 53 as in the two-layer subnet manager M1. The path setting/release requesting unit 54 extracts an optimal route connecting the one-layer subnetworks NW11 and NW12, and sends the band reservation request R8 to all the links constituting the extracted route, i.e., in this case, the link L3.

[Band reservation request R8]
Transmission destination: M11→112, 121
Route: L3

In practice, band reservations are performed in the switching nodes 112 and 121 at the two sides of the link L3. The band reservation response A8 is sent back in response to the success of the band reservations.

The path setting/release requesting unit 54 of the one-layer subnet manager M11 sends a band reservation request for routes in the one-layer subnetworks NW11 and NW12 to the one-layer subnet managers M11 and M12 of all the one-layer subnetworks NW11 and NW12 constituting the optimal route connecting the already extracted one-layer subnetworks NW11 and NW12.

More specifically, for the one-layer subnetwork NW11, the band reservation request R9 for a route connecting the switching node 111 accommodating the originating station T1 (link L1) and the switching node 112 accommodating the link L3 is sent to the one-layer subnet manager M11.

[Band reservation request R9]
Transmission destination: M11→M11
Route: 111–112

The band reservation request R10 for a route connecting the switching nodes 121 and 122 respectively accommodating the links L3 and L5 is sent to the one-layer subnet manager M12.

[Band reservation request R10]
Transmission destination: M11→M12
Route: 121–122

In response to the band reservation request R7 sent together with the band reservation request R6 from the two-layer subnetwork M1, the path setting/release requesting unit 54 of the one-layer subnet manager M21 refers to the inter-subnet routing table in the inter-subnet routing table holding unit 53 as in the one-layer subnet manager M11. The path setting/release requesting unit 54 then extracts an optimal route connecting the one-layer subnetworks NW21 and NW22, and sends the band reservation request R11 for all the links constituting the extracted route, i.e., in this case, the link L7.

[Band reservation request R11]
Transmission destination: M21→212, 221
Route: L7

In practice, band reservations are performed in the switching nodes 212 and 221 on the two sides of the link L7. The band reservation response A11 is sent back in response to the success of the band reservations.

As in the one-layer subnet manager M11, the path setting/release requesting unit 54 of the one-subnet manager M12 sends a band reservation request for routes in the one-layer subnetworks NW21 and NW22 to the one-layer subnet managers M21 and M22 of all the one-layer subnetworks NW21 and NW22 constituting the optimal route connecting the already extracted one-layer subnetworks NW21 and NW22.

More specifically, for the one-layer subnetwork NW21, the band reservation request R12 for a route connecting the switching nodes 211 and 212 respectively accommodating the links L5 and L7 is sent to the one-layer subnet manager M21.

[Band reservation request R12]
Transmission destination: M21→M21
Route: 211–212

The band reservation request R13 for a route connecting the switching node 221 accommodating the link L7 and the switching node 222 accommodating the terminating station T2 (link L9) is sent to the one-layer subnet manager M22.

[Band reservation request R13]
Transmission destination: M21→M22
Route: 221–222

In response to the band reservation request R9 from the one-layer subnetwork M11, the path setting/release requesting unit 54 of the one-layer subnet manager M11 refers to the intra-subnet routing table in the intra-subnet routing table holding unit 52 of the one-layer subnet manager M11. The path setting/release requesting unit 54 then extracts an optimal route connecting the switching nodes 111 and 112, and sends the band reservation request R14 for all the links constituting the extracted route, i.e., in this case, the link L2.

[Band reservation request R14]
Transmission-destination: M11→111, 112
Route: L2

Similarly, in response to the band reservation request R10 from the one-layer subnetwork M11, the path setting/release requesting unit 54 of the one-layer subnet manager M12 refers to the intra-subnet routing table in the intra-subnet routing table holding unit 52 of the one-layer subnet-manager M12. The path setting/release requesting unit 54 then extracts an optimal route connecting the switching nodes 121 and 122, and sends the band reservation request R15 for all the links constituting the extracted route, i.e., in this case, the link L4.

[Band reservation request R15]
Transmission destination: M12→121, 122
Route: L4

In addition, in response to the band reservation requests R12 and R13 from the one-layer subnetwork M21, the path setting/release requesting units 54 of the one-layer subnet managers M21 and M22 refer to the intra-subnet routing tables in the intra-subnet routing table holding units 52 of the one-layer subnet managers M21 and M22. The path setting/release requesting units 54 then extract optimal routes connecting the switching nodes 211 and 212 and the switching nodes 221 and 222, and send the band reservation requests R16 and R17 for all the links constituting the extracted routes, i.e., in this case, the links L6 and L8.

[Band reservation request R16]
Transmission destination: M21→211, 212
Route: L6

[Band reservation request R17]
Transmission destination: M22→221, 222
Route: L8

The band reservation requests R6 and R7 are parallelly sent from the two-layer subnet manager M1, the band reservation requests R8, R9, R10 and the band reservation requests R11, R12, and R13 are parallelly sent from the one-layer subnet managers M11 and M12, respectively. The band reservation requests R14 to R17 are parallelly sent from the one-layer subnet managers M11, M12, M21, and M22, respectively.

Every time each subnet manager sends a band reservation request, pieces of route information of a route requested by the band reservation request such as the link and subnetwork IDs and the subnet manager and switching node IDs are stored in the set route storage units 65 and 66, respectively.

This route information is used to detect a route used in communication upon reception of a band release request (to be described later).

In response to the band reservation requests R14 to R17, band reservations are performed in the switching nodes 111 and 112, 121 and 122, 211 and 212, and 221 and 222 on the two sides of the links L2, L4, L6, and L8. The band reservation responses A14 to A17 are sent back in response to success of the band reservations.

The one-layer subnet managers M11, M12, M21, and M22 respectively send back the band reservation responses A9, A10, A12, and A13 to the one-layer subnet managers M11 and M21 in response to the band reservation responses A14 to A17.

In response to the band reservation responses A9 and A10, the one-layer subnet manager M11 sends back the band reservation response A6 to the two-layer subnet manager M1 of high hierarchical level. The one-layer subnet manager M21 sends back the band reservation response A7 to the two-layer subnet manager M1 of high hierarchical level in response to the band reservation responses A12 and A13.

In response to this, the two-layer subnet manager M1 sends back the band reservation response A3 representing the success of the band reservation from the switching node 111 to the terminating station T2 to the transmission source of the first received band reservation request R3, i.e., to the switching node 111 accommodating the originating station T1.

The switching node 111 sends back, to the originating station T1, the band reservation response A1 representing the success of the band reservation from the originating station T1 to the terminating station T2. In response to this, transmission of communication data from the originating station T1 to the terminating station T2 is started. Data communication using the bands reserved and assured in the respective links and switching nodes can be realized.

When unsuccess of the band reservation occurs in one of the links constituting the route extracted in each subnet manager is detected, a band reservation response representing this is sent back. In this case, route information of the unsuccessful route is read out from the set route holding units 65 and 66, and a band release request is sent to each link, each subnet manager or each switching node which is associated with this unsuccessful route. Therefore, the bands of the links whose bands has been reserved in the unsuccessful route are released.

At the same time, an optimal route is extracted with reference to the inter- or intra-subnet routing table of the home subnetwork, and band reservation requests for the links having the same hierarchical level and constituting this optimal route are sent. The operations are repeated a plurality of times in accordance with the unsuccess of the band reservations.

The number of times repeated upon unsuccess of the band reservation may be determined based on the value set for each hierarchical level, i.e., communication quality information. Alternatively, the number of times may be determined in accordance with the individual band reservation requests from the originating station T1.

When the band reservation is to be performed for each request, a band reservation repetition count in each hierarchical level is set as communication quality information (e.g., a QOS parameter) in the band reservation request from the originating station T1, and the resultant information is sent. When the band reservation becomes unsuccessful, the subnet manager of each hierarchical level repeatedly performs the band reservation on the basis of the repetition count of its own hierarchical level set in the band reservation request.

A communication service on the basis of the communication quality corresponding to the request of a user can be offered. For each VC connection, the user can set the communication quality in accordance with the degree of importance of the communication data, thereby realizing efficient band utilization.

In the above description, the originating and terminating stations T1 and T2 are accommodated in different two-layer subnetworks. However, when the originating and terminating stations T1 and T2 are accommodated in a single two-layer subnetwork, the address of the originating station T1 is compared with that of the terminating station T2 in the switching node 111 in response to the band reservation request from the originating station T1. The address changes at the first one-layer subnetwork for the first time. The band reservation request R3 sent from the switching node 111 is sent to the one-layer subnet manager M11. The one-layer subnet manager M11 sends the band reservation request R4 for the link with the terminating station T2. In the same manner as described above, the band reservation requests for the routes in the two-layer subnetwork NW1 are sequentially sent.

When the originating and terminating stations T1 and T2 are accommodated in a single one-layer subnetwork, the band reservation request R3 sent from the switching node 111 is sent to the one-layer subnet manager M11. The one-layer subnet manager M11 sends the band reservation request R4 for the link with the terminating station T2. In the same manner as described above, the band reservation requests for routes in the one-layer subnetwork NW11 are sent to the respective switching nodes.

When the originating and terminating stations T1 and T2 are accommodated in the single switching node 111, the band reservation request R4 for the link with the terminating station T2 is sent from the switching node 111. The band reservation response A1 is sent back to the originating station T1.

Band release processing for a route up to the terminating station T2 in response to a band release request from the originating station T1 will be described as the operation of the present invention with reference to FIGS. 1 and 8.

Figure 8:
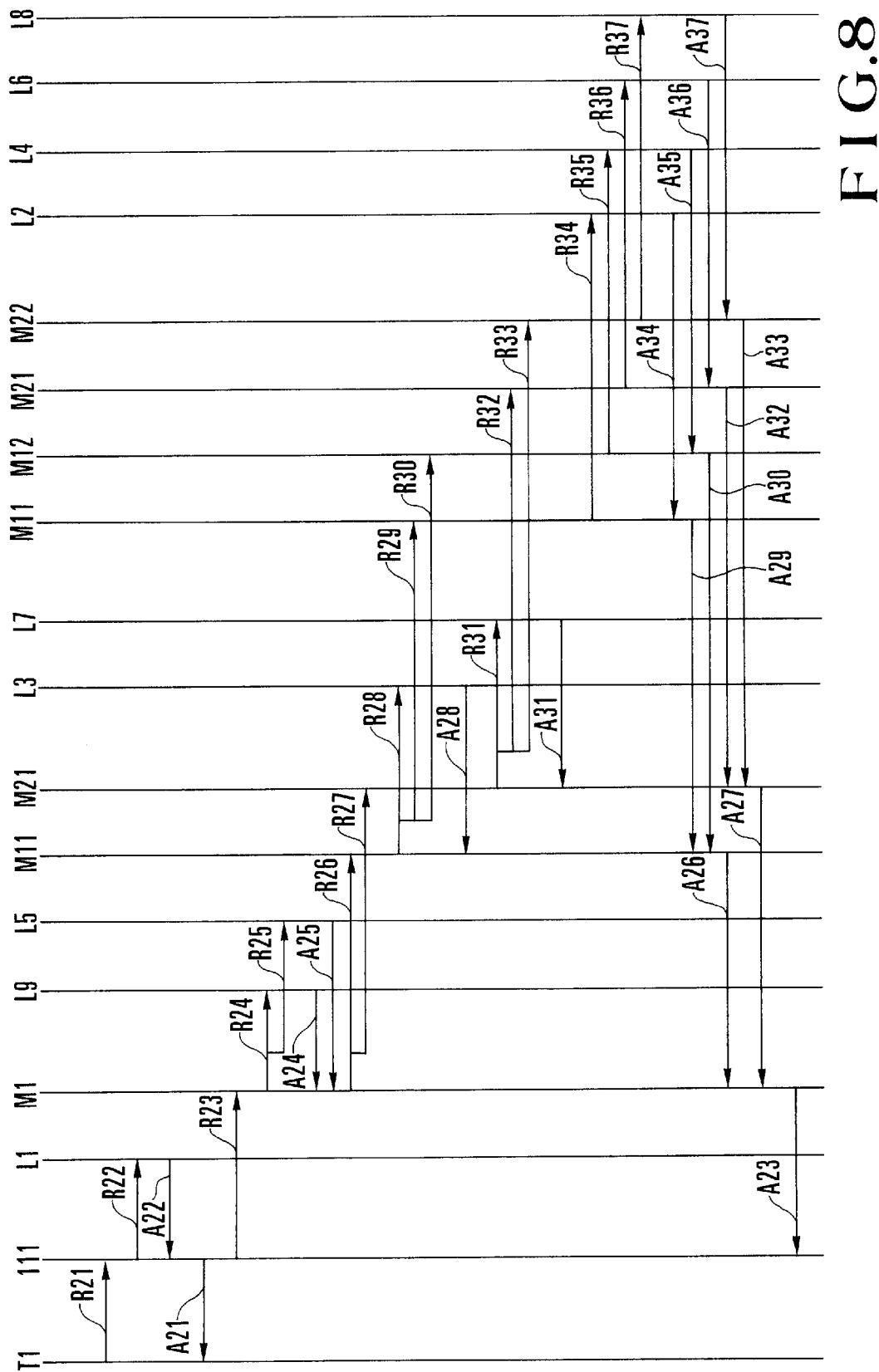
FIG. 8 is a sequence chart showing VC connection procedures other than those in FIG. 7.

FIG. 8 is a sequence chart showing VC release procedures from the originating station T1 to the terminating station T2. The same reference numerals as in FIG. 1 denote the same parts in FIG. 8.

Referring to FIG. 8, reference symbols R21 to R37 denote band release requests; and A21 to A37, band release responses representing success of the band releases sent back in correspondence with the band release requests R21 to R37.

Upon completion of data communication, in response to a communication end request generated by the originating station T1, the band release request R21 including a necessary communication bandwidth, a terminating address representing the terminating station, and a home address representing the originating station is sent to the switching node 111 serving as an accommodating source of the originating station T1.

[Band release request R21]
Transmission destination: T1→111
Route: T1–T2

The switching node 111 transmits the band release request R22 of the link L1 connecting the originating station T1 in response to the band release request R21 from the originating station T1.

[Band release request R22]
Transmission destination: 111→111, T1
Route: L1

The band release request R22 for the link L1 is actually transmitted to the nodes at the two sides of the link L1, i.e., the Switching node 111 and the originating station T1. The switching node 111 and the originating station T1 release desired bandwidths in response to the band release request from the originating station T1, i.e., perform band releases.

If band releases are successful in both the switching node 111 and the originating station T1, the band release response A22 representing the success of band releases is sent back from the switching node 111 and the originating station T1 to the switching node 111. The switching node 111 confirms the end of band release for the link L1 with the originating station T1. The band release response A21 representing the success of the band release is sent back to the originating station T1.

In response to the end of the band release for the link L1, the switching node 111 sends the band release request R23 to the transmission destination of the band reservation request R3 stored upon sending the band reservation request R3, i.e., to the two-layer subnet manager M1 of the two-layer subnetwork NW1.

[Band release request R23]
Transmission destination: 111→M1
Route: 111–T2

In the above description (FIG. 8), at the end of the band release for the link L1, the switching node 111 sends the band release request R23 to the two-layer subnet manager M1. However, the transmission order of the band release requests is not limited to this. For example, simultaneously with or after the transmission of the band release request R23 to the two-layer subnet manager M1, the band release request R22 may be sent for the link L1. In general, since the time required for releasing the bands for the respective links up to the terminating station T2 is much longer than that required for releasing the band for the link L1, simultaneously with or after the transmission of the band release request R23, the band release request R22 is sent, so that the band release processing operations of these requests can be parallelly performed, thereby shortening the band release time.

In response to the band release request R23, the path setting/release requesting unit 64 of the two-layer subnet manager M1 sends the band release request R24 to the link L9 connecting the terminating station T2 and the switching node 222 serving as the terminating station accommodation source.

[Band release request R24]
Transmission destination: M1→222, T2
Route: L9

In practice, as in the band release request for the link L1 on the originating station T1 side, band releases are performed in the switching node 222 and the terminating station T2 on the two sides of the link L9. The band release response A24 is sent back in response to the success of the band releases.

After the band release is requested for each link constituting the route connecting the terminating station T2 and the switching node 111 serving as the accommodation source of the originating station T1, the band is released for the link L1 between the originating station T1 and the switching node 111 serving as the originating station accommodation source. For this reason, high-speed band,releases can be performed. Efficiency for other calls and re-utilization of burst band reservations can be improved, and highly efficient band release processing can be performed.

On the other hand, in response to the band release request R23, the path setting/release requesting unit 64 of the two-layer subnet manager M1 refers to the set route holding unit 65 and reads out the route used in this data communication. The path setting/release requesting unit 64 then sends the band release request R25 for the links having the same hierarchical level and constituting this readout route, i.e., in this case, the link L5.

[Band release request R25]
Transmission destination: M1→122, 211
Route: L5

In practice, band releases are performed in the switching nodes 122 and 211 on the two sides of the link L5. The band release response A25 is sent back in response to the success of the band releases.

In this case, in the two-layer subnet manager M1, the band release request R24 for the link L9 and the band release request R25 for the link L5 are independently transmitted in response to the band release request R23.

The band release processing executed in response to each band release request does not require a new resource, i.e., a band for executing the processing, unlike the band reservation processing. Therefore, the band release processing is always successful.

In addition, even if a failure has occurred in a switching node designated for the band release request, a switching node adjacent to this failed node is not adversely affected by the delay of the band release. Thereafter, the failed node is recovered to release the corresponding band.

Since necessity for confirming the band release response in response to a band release request is low, the band release requests R24 and R25 can be parallelly sent to shorten the time required for these band release processing operations as a whole.

After the confirmation of the band release responses A24 and A25, the path setting/release requesting unit 64 of the two-layer subnet manager M1 sends the band release requests R26 and R27 for routes read out and used in data communication in the respective two-layer subnetworks to single subnet managers which respectively belong to the two-layer subnetworks NW1 and NW2 on the extracted routes and have a hierarchical level lower by one level than the two-layer subnetworks NW1 and NW2, i.e., the single subnet managers being one of the one-layer subnet managers M11 and M12 and one of the one-subnet managers M21 and M22. More specifically, one of the routes is a route connecting the one-layer subnetwork NW11 accommodating the originating station T1 and the one-subnetwork NW12 accommodating the link L5 in the two-layer subnetwork NW1. The other route is a route connecting the one-layer subnetwork NW21 accommodating the link L5 and the one-layer subnetwork NW 22 accommodating the terminating station T2 in the two-layer subnetwork NW2.

Using one of the above selection methods as in the method of the one-layer subnet manager in band reservation, for example, the one-layer subnet manager M11 is selected in the two-layer subnetwork NW1, and the one-layer subnet manager M21 is selected in the two-layer subnetwork NW2. The path setting/release requesting unit 64 of the two-layer subnet manager M1 sends the band release request R26 for a route between the one-layer subnetwork NW12 having the switching node 111 accommodating the originating station T1 and the one-layer subnetwork NW12 accommodating the link L5.

[Band release request R26]

Transmission destination: M1→M11

Route: NW11–NW12

In addition, the path setting/release requesting unit 64 of the two-layer subnet manager M1 sends, together with the band release request R26, the band release request R27 for a route between the one-layer subnetwork NW22 having the switching node 222 accommodating the terminating station T2 and the one-layer subnetwork NW21 accommodating the link L5.

[Band release request R27]

Transmission destination: M1→M21

Route: NW21–NW22

In the above description, the path setting/release requesting unit 64 of the two-layer subnet manager M1 sends the band release requests R26 and R27 to the one-layer subnet managers M11 and M21 after confirming the success of the band releases for the links L9 and L5 in response to the band release responses A24 and A25.

However, the band release requests R26 and R27 may be sent together with, e.g., the band release request R25 prior to the confirmation of the band release responses A24 and A25 because necessity for confirming the band release responses in response to the band release requests is low, as in the band release requests R24 and R25. Therefore, the total time required for the band release processing can be shortened.

In response to the band release request R26, the path setting/release requesting unit 54 of the one-layer subnet manager M11 refers to the set route holding unit 55 as in the two-layer subnet manager M1. The path setting/release requesting unit 54 reads out an optimal route connecting the one-layer subnetworks NW11 and NW12, and sends the band release request R28 to all the links present in the readout route, i.e., in this case, the link L3.

[Band release request R28]

Transmission destination: M11→112, 121

Route: L3

In practice, band releases are performed in the switching nodes 112 and 121 at the two sides of the link L3. The band release response A28 is sent back in response to the success of the band releases.

The path setting/release requesting unit 54 of the one-layer subnet manager M11 refers to the set route holding unit 55. The path setting/release requesting unit 54 sends a band release request for routes in the one-layer subnetworks NW11 and NW12 to the one-layer subnet managers M11 and M12 of all the one-layer subnetworks NW11 and NW12 present in the route having connected the already readout one-layer subnetworks NW11 and NW12.

More specifically, for the one-layer subnetwork NW11, the band release request R29 for a route having connected the switching node 111 accommodating the originating station T1 and the switching node 112 accommodating the link L3 is sent to the one-layer subnet manager M11.

[Band release,request R29]

Transmission destination: M11→M11

Route: 111–112

The band release request R30 for a route having connected the switching nodes 121 and 122 respectively accommodating the links L3 and L5 is sent to the one-layer subnet manager M12.

[Band release request R30]

Transmission destination: M11→M12

Route: 121–122

In response to the band release request R27 sent together with the band release request R26 from the two-layer subnetwork M1, the path setting/release requesting unit 54 of the one-layer subnet manager M21 refers to the set route holding unit 55 as in the one-layer subnet manager M11. The path setting/release requesting unit 54 then reads out an optimal route having connected the one-layer subnetworks NW21 and NW22, and sends the band release request R31 for all the links present in the readout route, i.e., in this case, the link L7.

[Band release request R31]

Transmission destination: M21→212, 221

Route: L7

In practice, band releases are performed in the switching nodes 212 and 221 on the two sides of the link L7. The band release response A31 is sent back in response to the success of the band releases.

The path setting/release requesting unit 54 of the one-subnet manager M12 refers to the set route holding unit 55 as in the one-layer subnet manager M11. The path setting/release requesting unit 54 sends a band release request for routes in the one-layer subnetworks NW21 and NW22 to the one-layer subnet managers M21 and M22 of all the one-layer subnetworks NW21 and NW22 present in the route having connected the already readout one-layer subnetworks NW21 and NW22.

More specifically, for the one-layer subnetwork NW21, the band release request R32 for a route having connected the switching nodes 211 and 212 respectively accommodating the links L5 and L7 is sent to the one-layer subnet manager M21.

[Band release request R32]

Transmission destination: M21→M21

Route: 211–212

The band release request R33 for a route having connected the switching node 221 accommodating the link L7 and the switching node 222 accommodating the terminating station T2 (link L9) is sent to the one-layer subnet manager M22.

[Band release request R33]

Transmission destination: M21→M22

Route: 221–222

In response to the band release request R29 from the one-layer subnetwork M11, the path setting/release requesting unit 54 of the one-layer subnet manager M11 refers to the set route holding unit 55 of the one-layer subnet manager M11. The path setting/release requesting unit 54 then reads out a route having connected the switching nodes 111 and 112, and sends the band release request R34 for all the links present in the readout route, i.e., in this case, the link L2.

[Band release request R34]

Transmission destination: M11→111, 112

Route: L2

Similarly, in response to the band release request R30 from the one-layer subnetwork M11, the path setting/release requesting unit 54 of the one-layer subnet manager M12 refers to the set route holding unit 55 of the one-layer subnet manager M12. The path setting/release requesting unit 54 then reads out an optimal route having connected the switching nodes 121 and 122, and sends a band release request R35 for all the links present in the readout route, i.e., in this case, the link L4.

[Band release request R35]

Transmission destination: M12→121, 122

Route: L4

In addition, in response to the band release requests R32 and R33 from the one-layer subnetwork M21, the path setting/release requesting units 54 of the one-layer subnet managers M21 and M22 refer to the set route holding units 55 of the one-layer subnet managers M21 and M22, respectively. The path setting/release requesting units 54 then reads out routes having connected the switching nodes 211 and 212 and the switching nodes 221 and 222, and send band release requests R36 and R37 for all the links present in the readout routes, i.e., in this case, the links L6 and L8.

[Band release request R36]

Transmission destination: M21→211, 212

Route: L6

[Band release request R37]

Transmission destination: M22→221, 222

Route: L8

The band release requests R26 and R27 are parallelly sent from the two-layer subnet manager M1, the band release requests R28, R29, R30 and the band release requests R31, R32, and R33 are parallelly sent from the one-layer subnet managers M11 and M12, respectively. The band release requests R34 to R37 are parallelly sent from the one-layer subnet managers M11, M12, M21, and M22, respectively.

In response to the band release requests R34 to R37, band releases are actually performed in the switching nodes 111 and 112, 121 and 122, 211 and 212, and 221 and 222 on the two sides of the links L2, L4, L6, and L8. The band release responses A34 to A37 are sent back in response to success of the band releases.

The one-layer subnet managers M11, M12, M21, and M22 respectively send back the band release responses A29, A30, A32, and A33 to the one-layer subnet managers M11 and M21 in response to the band release responses A34 to A37. The pieces of route information of the band-released routes are erased from the set route holding units 55.

In response to the band release responses A29 and A30, the one-layer subnet manager M11 sends back the band release response A26 to the two-layer subnet manager M1 of high hierarchical level. The one-layer subnet manager M21 sends back the band release response A26 to the two-layer subnet manager M1 of high hierarchical level in response to the band release responses A32 and A33. The pieces of route information of the band-released routes are erased from the set route holding units 55.

In response to this, the two-layer subnet manager M1 sends back the band release response A23 representing the success of the band release from the switching node 111 to the terminating station T2 to the transmission source of the first received band release request R23, i.e., to the switching node 111 accommodating the originating station T1. The route information of the band-released route is erased from the set route holding unit 55.

The bands of all the links constituting the route having connected the switching node 111 accommodating the originating station T1 and the switching node 222 accommodating the terminating station T2 are released parallelly. The high-speed band releases are performed to realize efficient band utilization.

In the above description, each subnetwork has been exemplified as a network having two layers, i.e., one- and two-layer subnetworks. However, the present invention is also applicable to a network having three or more layers. If the number of layers is given as m, each subnetwork of lowest hierarchical level (m=1) is constituted by a plurality of switching nodes, one-layer subnet manager (FIG. 2) is arranged as a lowest-layer subnet manager for each subnetwork of lowest hierarchical level or lowest layer, each of layers (m>1) of higher hierarchical levels is constituted by a plurality of subnetworks each having a hierarchical level (m−1) which is lower one level than a network of high hierarchical level, and a two-layer subnet manager (FIG. 2) is arranged as a subnet manager of a higher hierarchical level for each subnetwork of high hierarchical level.

In the above description, links are used to connect switching nodes and connect subnetworks. However, these components may be connected through a network based on other connection procedures, e.g., an ATM public network.

In this case, of the two switching nodes located at two sides of a link constituted by the network based on other connection procedures, one switching node requests a call setting/release to this network in response to a band reservation/release request from a predetermined subnet manager. At the same time, in response to the call setting/release request from this network, the other switching node immediately sends back a band reservation/release response to the subnet manager. Therefore, the band reservation/release processing time between these two switching nodes can be shortened.

For example, as in the link L2 in FIG. 1, when the network based on other connection procedures is present in the link connecting switching nodes in a subnetwork, the band reservation request R14 is sent from the one-layer subnet manager M11 to the switching nodes 111 and 112, and a call setting based on predetermined connection procedures is sent back from the switching node 111 on the originating station T1 side to the network.

In response to this, the call setting is, executed in each node constituting this network, and the call setting is sent from this network to the switching node 112.

In general, the switching node 112 sends back the call setting response to the network, and this response is sent back to the switching node 111 through the network. After the call setting response is confirmed by the switching node 111, the band reservation response A14 is sent back from the switching node 111 to the one-layer subnet manager M11.

In this case, the band reservation processing is executed in the switching node 112 on the terminating station T2 side in response to the call setting request from the network. A band reservation response representing its processing result is immediately sent back to the one-layer subnet manager M11.

On the other hand, as in the link L3 in FIG. 1, the same operation as described above is similarly applied when a network based on other connection procedures is present in a link connecting the subnetworks.

For example, the band reservation request R8 for the link L3 is sent from the one-layer subnet manager M11 to the switching node 112. At the same time, the band reservation request R8 is sent to the switching node 121 through the one-layer subnet manager M12. In response to the call setting request from the network, the band reservation response is immediately sent back from the switching node 121 to the one-layer subnet manager M11 through the one-layer subnet manager M12.

Note that the band reservation request (call setting) has been exemplified above. However, this operation can similarly be applied to a band release request (call release).

Upon reception of a band reservation/release response from a switching node on the terminating station side, the band reservation/release on the link through the network or the normal operation of the switching node on the originating station side may be confirmed by the subnet manager serving as the band reservation/release request source on the basis of the band reservation/releaser response sent from the switching node on the originating station side.

As described above, when a network based on other connection procedures is present in a network, a band reservation/release response is directly sent back from a switching node on the terminating station side to a subnet manager serving as a band reservation/release request source in response to a call setting/release request from the network. As compared with a case wherein the band reservation/release response is sent back from the switching node on the originating station through the network, the subnet manager serving as the request source can confirm the band reservation/release within a shorter period of time, thereby shortening the band reservation/release processing time between these switching nodes.

As has been described above, according to the present invention, a network has a hierarchical structure in which a subnetwork of high hierarchical level is constituted by a plurality of subnetworks of low hierarchial level. Subnet managers are arranged for subnetworks, respectively. An optimal route between subnetworks connected to have the same hierarchical level is individually managed. In particular, an optimal route between switching nodes in a one-layer subnetwork managed by a subnet manager of lowest hierarchical level (one layer) is also individually managed. All the links constituting the network can be managed in a distributed manner. A failure caused by concentration of management processing on a switching node accommodating an originating station and a subnet manager can be prevented. At the same time, a special node having a high processing capability for executing the management processing need not be arranged in the network, but an optimal route can be selected at high speed. In addition, band reservation requests are parallelly sent to each link and a subnet manager of low hierarchical level, and high-speed band reservations for routes between the originating and terminating stations can be performed.

A band reservation for a link connecting the originating station and the switching node accommodating the originating station is performed in response to a band reservation request from the originating station, and band reservations for each repeating link and a subscriber link which constitute a route connecting the terminating station and the switching node accommodating the originating station are performed upon success of the band reservation for the link connecting the originating station and the switching node accommodating the originating station. For this reason, a desired band reservation request for the link between the originating station and the switching node accommodating the originating station is performed prior to the band reservation requests for other links. Wasteful processing in which a call loss is caused by the unsuccess of the link with the originating station although the band reservations for other links are successful can be prevented. Therefore, efficient band reservation processing can be performed.

Each of the originating and terminating stations has a network address consisting of identifiers of a subnetwork of each hierarchical level and each switching node. The switching node accommodating the originating station sequentially compares the originating and terminating station network addresses of a band reservation request from the originating station in an order from an identifier of high hierarchical level in response to the band reservation request from the originating station. A given route from a home switching node to the terminating station is sent to a subnet manager corresponding to first appearance of an originating station identifier of another hierarchical level. In the network having a hierarchical structure, subnet managers of highest hierarchical level as a minimum limit for connecting the originating and terminating stations can be accurately extracted at high speed.

Each subnet manager refers to contents of a home subnetwork to extract an optimal route and sends a new band reservation request for the optimal route when a band reservation response representing unsuccess of a band reservation is sent back in response to a transmitted band reservation request. For this reason, even if the band reservation for a specific link becomes unsuccessful, an optimal one of the routes which can be band-reserved at the present moment can be selected, and the band reservation is executed. Therefore, a possibility for call loses can be reduced.

A new band reservation request for a next optimal route upon unsuccess of a band reservation is repeated by a repetition count determined for unsuccess of a band reservation in all hierarchical levels or each hierarchical level, and a band reservation response representing unsuccess of the band reservation is sent back to a band reservation request source of each receiving subnet manager in response to unsuccess of a subsequent band reservation. For this reason, an increase in route length in which the number of via subnets increases in a specific hierarchical level, and an increase in band reservation processing time can be reduced. In any hierarchical level, efficient route selection can be performed.

The originating station sets a repetition count for unsuccess of a band reservation in correspondence with each hierarchical level and sends the repetition count in response to a band reservation request. Each subnet manager repeats a new band reservation request for a next optimal route upon unsuccess of a band reservation by the repetition count determined for unsuccess of a band reservation in the hierarchical level of the home subnetwork. Each subnet manager sends back a band reservation response representing unsuccess of the band reservation to a band reservation request source of each receiving subnet manager in response to unsuccess of a subsequent band reservation. A communication service based on communication quality corresponding to the request of the user can be offered. The user can set the communication quality for each VC connection in accordance with the degree of importance of the communication data, thereby realizing effective band utilization.

A switching node has an available link bandwidth holding unit for storing available link bandwidths of the respective links, and a notification unit for notifying these available link bandwidths to a subnet manager of high hierarchical level. The latest available link bandwidth is notified to the subnet manager of high hierarchical level. The table management unit of the first-layer subnet manager updates and holds the intra-subnetwork routing table holding unit from a larger available link bandwidth and a smaller number of hops. At the same time, the table management unit of each subnet manager updates the contents of the inter-subnet routing table holding unit from a larger available link bandwidth of a boundary link which is exchanged between predetermined subnet managers having a small via subnet count and connected to have the same hierarchical level. For this reason, each subnet manager can always manage the latest optimal route in a distributed manner without requiring a route management node or a complicated arrangement. At the same time, an optimal route can be determined by simply reading out the routes in a holding order from each table holding unit in response to a band reservation request. The optimal route at the time of a band reservation from a large number of routes can be immediately obtained.

The path setting/release requesting unit of each subnet manager parallelly sends band reservation requests for all links connecting individual subnetworks along the optimal route and parallelly sends band reservation requests for routes in these subnetworks to the subnet managers of the subnetworks of low hierarchical level located on the optimal route. In addition, the path setting/release requesting unit of the one-layer subnet manager parallelly sends band reservation requests for all links connecting individual switching nodes along the optimal route. For this reason, new band reservation requests are sent to only the minimum numbers of links and subnet managers in response to the band reservation request. Unlike in the conventional case wherein a route is determined not in consideration of a possibility of success/unsuccess of the band reservation for a lower hierarchical level, a highly efficient VC connection with a low loss probability can be realized. As compared with the conventional case wherein a band reservation request is sent to a route which has a low possibility of practical use, call processing of the entire network can be reduced, and an increase in loss probability of the entire network by wasteful band reservations can be prevented.

Subnet managers and switching nodes of the respective hierarchical levels belonging to a common subnetwork of high hierarchical level are connected through a communication line. Various control messages can be directly exchanged between these subnet managers and between the subnet manager and a switching node regardless of differences in hierarchical level. As compared with the case wherein transfer is performed through a plurality of subnet managers, the control message arrival time can be shortened. The VC connection time can be shortened, and the processing load can be reduced.

Each available link bandwidth is directly notified from a switching node to a management source subnet manager for managing the available link bandwidth. For this reason, a notification time delay can be shortened, and the inter-subnet routing table can be updated at high speed, thereby improving the reliability of the table and hence reducing the loss probability.

The notification unit of a switching node compares a latest available link bandwidth calculated from a free band of a link accommodating the switching node or a cell or packet loss probability thereof with the available link bandwidth held in the available link bandwidth holing unit, and when a difference between the latest available link bandwidth and the available link bandwidth held in the available link bandwidth holding unit exceeds a predetermined threshold, notifies a new available link bandwidth to the management source subnet manager of each link and updates and holds the new available link bandwidth in the available link bandwidth holding unit. As compared with a case wherein an available link bandwidth is notified at any time, the processing loads of the switching node and each subnet manager can be reduced. At the same time, an unexpected variation in available link bandwidth can be notified at high speed.

The notification unit of a switching node updates and holds a latest available link bandwidth calculated from a free band of a link accommodating the switching node or a cell or packet loss probability thereof in the available link bandwidth holding unit for each link accommodating the switching node. This notification unit periodically notifies the available link bandwidths of the respective links to the management source subnet managers of the respective links. For this reason, an arrangement and processing for comparing the available link bandwidth with the threshold can be omitted from each switching node, and the arrangement of the switching node can be simplified.

One of the switching nodes connected to the two sides of each link notifies the available link bandwidth of the link to a management source subnet manager of each link. The processing load of the other switching node which does not perform notification can be reduced, and at the same time the processing load for managing the available link bandwidth in the management source subnet manager can be reduced.

When new band reservation requests are to be sent to subnet managers of low hierarchical level in subnetworks having the same hierarchical level located on the optimal route in response to band reservation requests, the path setting/release requesting unit of a subnet manager having a hierarchical level including subnetworks in a layer of low hierarchical level selects an arbitrary subnet manager having a minimum processing load and closest to the originating station, in a predetermined order or using a random number, from the respective subnet managers. The band reservation requests are parallelly sent. Therefore, the processing can be distributed for each VC connection without concentrating the processing on a specific subnet manager in each subnetwork. Therefore, the loss probability caused in an abnormal increase in processing load can be reduced.

Each subnet manager sends band reservation requests to two switching nodes connected to two sides of a given link when the band reservation requests are to be sent for the given link constituted by a network based on other connection procedures. One of the two switching nodes sends a predetermined call setting request to the network in response to the band reservation request. The other of the two switching nodes sends back a predetermined band reservation response to a corresponding subnet manager in response to the call setting request from the network. For this reason, as compared with the case wherein the band reservation request is sent back from the switching node on the originating station through the network, the subnet manager serving as the request source can confirm the band reservation within a shorter period of time. Therefore, the band reservation processing time between these switching nodes can be shortened.

When a band reservation request is to be sent to each link or an arbitrary subnet manager on the optimal route, each subnet manager holds route information of a route set in response to the band reservation request for each VC connection or each burst connection upon the call connection. The corresponding route information is read out in response to the band release request, and the band release requests are sequentially and parallelly sent to the links and subnet managers of low hierarchical level on this route. For this reason, the band release requests are properly sent to only the required numbers of minimum links and subnet mangers. At the same time, the band release processing can be parallelly performed in each link and each subnet manager, thereby quickly releasing the links. As a result, highly efficient band utilization of the entire network can be realized.

Band release requests are performed for each repeating link and a subscriber link which constitute a route connecting the switching node accommodating the originating station and the terminating station, and then a band release of a link connecting the originating station and the switching node accommodating the originating station is performed. For this reason, the bands of each repeating link and the subscriber link between the repeating link and the terminating station can be released at high speed. Even if a new communication start request from another station is generated, a desired band can be immediately assured, and highly efficient band utilization can be realized.

Each subnet manager sends band release requests to two switching nodes connected to two sides of a given link when the band release requests are to be sent for the given link constituted by a network based on other connection procedures. One of the two switching nodes sends a predetermined call setting request to the network in response to the band release request. The other of the two switching nodes sends back a predetermined band release response to a corresponding subnet manager in response to the call setting request from the network. As compared with the case wherein the band release response is sent back from the switching node on the originating station through the network, the subnet manager serving as the request source can confirm the band release within a short period of time. Therefore, the band release processing time between the switching nodes can be shortened.

In response to a VC release request from the originating/terminating station or a band release request based on a burst information transmission end request upon call connection from the originating station, a band release request is transmitted from the switching node accommodating the originating/terminating station to the predetermined m-th layer subnet manager. The band release requests are parallelly and sequentially transmitted from this m-th layer subnet manager to layers of low hierarchical level. Therefore, the band of a given link located on a route used in communication is released by switching nodes at two sides of the given link.

What is claimed is:

1. A VC connection method for determining a connection route on a network having a plurality of switching nodes and performing a band reservation/release corresponding to a necessary communication capacity for a link for connecting each switching node on the connection route in connecting originating and terminating stations through said network in response to a VC connection/release request or a burst information transmission start/end request upon a call connection from said originating station accommodated in a predetermined switching node, comprising the steps of:

causing said network to have a hierarchical structure, said hierarchical structure having at least one mth-layer, where m is a positive integer of not less than 2, said mth-layer further including a plurality of (m−1)-layer subnetworks wherein each of first-layer subnetworks includes a plurality of switching nodes interconnected through a predetermined link;

providing a first-layer subnetwork manager for each of said first-layer Subnetworks to update and hold a plurality of routes, in a predetermined order, connecting the switching nodes and first-layer subnetworks between predetermined switching nodes in a home subnetwork and predetermined first-layer subnetworks connected to have the same hierarchical level, and providing an mth-layer subnet manager for said mth-layer subnetwork to update and hold a plurality of routes, in a predetermined order, connecting predetermined mth-layer subnetworks connected to have the same hierarchical level;

causing said mth-layer subnet manger to refer to contents of a home subnetwork in response to a band reservation request to determine an optimal route from said plurality of routes connecting requested mth-layer subnetworks, send a band reservation request for a link located on this optimal route, and send a band reservation request for a route in the mth-layer subnetwork to an arbitrary (m−1) th-layer subnet manger in each (m−1) th-layer subnetwork located on the optimal route;

causing said first-layer subnet manager to refer to contents of a home subnetwork in response to a band reservation request from a subnet manger of high hierarchical level to determine an optimal route from said plurality of routes connecting predetermined first-layer subnetworks as a route in the requested subnetwork of high hierarchical level, send a band reservation request for a link located on the optimal route, and send a band reservation request for a route, and send a band reservation request for a route in each first-layer subnetwork to the first-layer subnet manager of each first-layer subnetwork located on the optimal route;

causing the first-layer subnet manager located on the optimal route to refer to contents of a home one-layer subnetwork in response to a band reservation request from an arbitrary first-layer subnet manager to determine an optimal route from said plurality of routes between predetermined switching nodes as a route in the requested first-layer subnetwork; and sending a band reservation request from said predetermined node accommodating said originating station to said predetermined mth-layer subnet manager in response to a band reservation request based on the VC connection request or the burst information transmission start request or the burst information transmission start request upon the call connection from said originating station to sequentially and parallelly send band reservation requests from said mth-layer subnet manger to links of low hierarchical level, thereby reserving bands for switching nodes at two sides of each link located on the connection route.

2. A method according to claim 1, further comprising: performing a band reservation for a link connecting said originating station and said switching node accommodating said originating station in response to a band reservation request from said originating station; and performing band reservations for each repeating link and a subscriber link which constitute a route connecting said terminating station and said switching node accommodating said originating station upon success of the band reservation for the link connecting said originating station and said switching node accommodating said originating station.

3. A method according to claim 1, wherein each of said originating and terminating stations has a network address consisting of identifiers of a subnetwork of each hierarchical level and each switching node, and said method comprises; causing said switching node accommodating said originating station to sequentially compare the originating and terminating station network addresses of a band reservation request from said originating station in an order from an identifier of high hierarchical level in response to the band reservation request from said originating station; determining a given route from a home switching node to said terminating station with respect to a subnet manager corresponding to first appearance of an originating station identifier of another hierarchical level; and sending a band reservation request for the given route.

4. A method according to claim 1, further comprising causing each subnet manager to refer to contents of a home subnetwork to extract a next optimal route from said plurality of routes and send a new band reservation request for the optimal route when a band reservation response representing unsuccess of a band reservation is sent back in response to a transmitted band reservation request.

5. A method according to claim 4, further comprising: repeating a new band reservation request for a next optimal route from said plurality of routes upon unsuccess of a band reservation, by a repetition count determined for unsuccess of a band reservation in all hierarchical levels or each hierarchical level; and sending back a band reservation response representing unsuccess of the band reservation to a band reservation request source of each receiving subnet manager in response to unsuccess of a subsequent band reservation.

6. A method according to claim 4, further comprising:

causing said originating station to set a repetition count for unsuccess of a band reservation in correspondence with each hierarchical level and sends the repetition count in response to a band reservation request; and causing each subnet manager to repeat a new band reservation request for a next optimal route from said plurality of routes upon unsuccess of a band reservation, by the repetition count determined for unsuccess of a band reservation in the hierarchical level of the home subnetwork, and send back a band reservation response representing unsuccess of the band reservation to a band reservation request source of each receiving subnet manager in response to unsuccess of a subsequent band reservation.

7. A method according to claim 1, wherein each switching node comprises an available link bandwidth holding unit for storing an available link bandwidth of each link accommodated in said each switching node, and a notification unit for notifying the available link bandwidth held in said available link bandwidth holding unit to a subnet manager of high hierarchical level;

the first-layer subnet manager comprises an intra-subnetwork routing table for holding a plurality of routes, in a predetermined order, connecting predetermined switching nodes in a home subnetwork for said predetermined switching nodes in said home subnetwork, an inter-subnet routing table holding unit for holding a plurality of routes, in a predetermined order, connecting between predetermined first-layer subnetworks connected to have the same hierarchical level for said predetermined first-layer subnetworks connected to have the same hierarchical level, a table management unit for updating contents of said intra-subnet routing table in an order from a larger available link bandwidth to a smaller available link bandwidth notified from each node having a smaller number of hops representing the number of switching nodes constituting each route in said home subnetwork, exchanging available link bandwidths of boundary links of adjacent subnetworks between said predetermined first-layer subnet managers connected to have the same hierarchical level, and updating contents of said inter-subnet routing table holding unit in an order from a larger available link bandwidth and a smaller via subnet count representing the number of first-layer subnetworks constituting each route, and a path setting/release requesting unit for referring the contents of said inter-subnet routing table holding unit in response to a band reservation request for a route between first-layer subnetworks to determine an optimal route from said plurality of routes connecting the requested first-layer subnetworks, parallelly sending band reservation requests for all links connecting individual first-layer subnetworks along the optimal route, parallelly sending band reservation requests for routes in each first-layer subnetwork to a first-layer subnet manager of each first-layer subnetwork located on the optimal route, referring to the contents of said intra-subnet routing table holding unit in response to the band reservation requests for the routes in each first-layer subnetwork to determine an optimal route from said plurality of routes connecting switching nodes of the requested first-layer subnetwork, and parallelly sending band reservation requests for all links connecting individual switching nodes along the optimal route;

the mth-layer subnet manager comprises an inter-subnet routing table holding unit for holding a plurality of routes, in a predetermined order, connecting predetermined mth-layer subnetworks connected to have the same hierarchical level for said predetermined mth-layer subnetworks connected to have the same hierarchical level, a table management unit for exchanging available link bandwidths of boundary links of a adjacent subnetworks between said predetermined mth-layer subnet managers connected to have the same hierarchical level and updating the contest of said inter-subnet routing table holding unit in an order from a larger available link bandwidth and a smaller via subnet count representing the number of mth-layer subnetworks constituting each a route, and a path setting/release requesting unit for referring to the contents of said inter-subnet routing table holding unit in response to a band reservation request for a route between mth-layer subnetworks to determine an optimal route from said plurality of routes connecting the requested mth-layer subnetworks, parallelly sending band reservation requests for all links connecting individual mth-layer subnetworks along the optimal route, and parallelly sending band reservation requests for routes between (m−1)th-layer subnetworks belonging to said individual mth-layer subnetworks to an arbitrary (m−1)th-layer subnet manager in each mth-layer subnetwork located on the optimal route.

8. A method according to claim 7, further comprising:

connecting a subnet manager of each hierarchical level and each switching node which belong to a common subnetwork of high hierarchical level; and directly exchanging messages such as call control message and request and response messages between subnet managers of the same hierarchical level, between subnet managers of high and low hierarchical levels, and between an arbitrary switching node and a management source subnet manager of a link having said arbitrary switching node, and directly notifying each available link bandwidth calculated by the switching node to the management source subnet manager of each link.

9. A method according to claim 7, further comprising causing a notification unit of a switching node to compare a latest available link bandwidth calculated from a free band of a link accommodating the switching node or a cell or packet loss probability thereof with the available link bandwidth held in said available link bandwidth holing unit, and when a difference between the latest available link bandwidth and the available link bandwidth held in said available link band width holding unit exceeds a predetermined threshold, notifying a new available link bandwidth to the management source subnet manager of each link and updating and holding the new available link bandwidth in said available link bandwidth holding unit.

10. A method according to claim 7, further comprising causing a notification unit of a switching node to periodically notify a latest available link bandwidth calculated from a free band of a link accommodating the switching node or a cell or packet loss probability thereof to the management source subnet manager of each link.

11. A method according to claim 7, comprising causing one of the switching nodes connected to the two sides of each link to notify the available link bandwidth of the link to a management source subnet manager of each link.

12. A method according to claim 1, further comprising: causing said path setting/release requesting unit of said mth-layer subnet manager to an arbitrary (m−1)th-layer subnet manager having a minimum processing load and closest to said originating station, in a predetermined order or using a random number, from the (m−1)th-layer subnet managers belonging to the mth-layer subnet in units of mth-layer subnetworks located on the optimal route; and parallelly sending band reservation requests for routes between the (m−1)th-layer subnetworks belonging to individual mth-layer subnetworks to the selected (m−1)th-layer subnet manager.

13. A method according to claim 1, further comprising:
causing each subnet manager to send band reservation requests to two switching nodes connected to two sides of a given link when the band reservation requests are to be sent for said given link constituted by a network based on other connection procedures;
causing one of the two switching nodes to send a predetermined call setting request to said network in response to the band reservation request; and
causing the other of the two switching nodes to send back a predetermined band reservation response to a corresponding subnet manager in response to the call setting request from said network.

14. A method according to claim 1, further comprising:
when a band reservation request is to be sent to each link or an arbitrary subnet manager on the optimal route, causing each subnet manager to hold route information of a route set in response to the band reservation request for each VC connection or each burst connection upon the call connection;

causing the mth-layer subnet manager to refer to route information of the mth-layer subnet manager in response to a band release request to send a band release request for a link located on a route already used in a corresponding VC connection or a corresponding burst connection upon a call connection, and sending a band release request for a route in the mth-layer subnetwork to each (m−1)th-layer subnet manager located on the route already used;

causing said first-layer subnet manager to refer to route information of said first-layer subnet manager in response to a band release request from a subnet manager of high hierarchical level to send a band release request for a line located on a route used in a corresponding VC connection or a corresponding burst connection upon a call connection, and sending a band release request for a route in each first-layer subnetwork to a first-layer subnet manager of each first-layer subnetwork on the route used;

causing said first-layer subnet manager on the route used to refer to route information of said first-subnet manager on the route used, in response to a band release request from a first-layer subnet manager, and sending a band release request for a link located on the route used in the corresponding VC connection or the corresponding burst connection upon the call connection;

causing said switching node accommodating said originating station to send a band release request to a predetermined mth-layer subnet manager in response to a band release request based on the VC release request or the burst information transmission end request upon the call connection from said originating station, subsequently and parallelly sending band release requests from the mth-layer subnet manager to a lower hierarchical level, and performing a band release of each link located on the route used in communication by using switching nodes located at the two sides of the link.

15. A method according to claim 14, further comprising performing band release requests for each repeating link and a subscriber link which constitute a route connecting said switching node accommodating said originating station and said terminating station, and then performing a band release of a link connecting said originating station and said switching node accommodating said originating station.

16. A method according to claim 14, further comprising:
causing each subnet manager to send band release requests to two switching nodes connected to two sides of a given link when the band release requests are to be sent for said given link constituted by a network based on other connection procedures;
causing one of the two switching nodes to send a predetermined call setting request to said network in response to the band release request; and
causing the other of the two switching nodes to send back a predetermined band release response to a corresponding subnet manager in response to the call setting request from said network.

* * * * *